US012603316B2

(12) United States Patent
Andersch et al.

(10) Patent No.: US 12,603,316 B2
(45) Date of Patent: Apr. 14, 2026

(54) CELL STACK, METHOD OF PRODUCING A CELL STACK AND FUEL CELL OR ELECTROLYSIS CELL INCLUDING A CELL STACK

(71) Applicant: Greenerity GmbH, Alzenau (DE)

(72) Inventors: Stefan Andersch, Göppingen (DE); Jens-Peter Suchsland, Alzenau (DE); Dominik Gehrig, Hanau (DE)

(73) Assignee: Greenerity GmbH, Alzenau (DE)

( * ) Notice: Subject to any disclaimer, the term of this patent is extended or adjusted under 35 U.S.C. 154(b) by 605 days.

(21) Appl. No.: 17/923,739

(22) PCT Filed: Mar. 30, 2021

(86) PCT No.: PCT/EP2021/058262
§ 371 (c)(1),
(2) Date: Nov. 7, 2022

(87) PCT Pub. No.: WO2021/228466
PCT Pub. Date: Nov. 18, 2021

(65) Prior Publication Data
US 2023/0178780 A1     Jun. 8, 2023

(30) Foreign Application Priority Data

May 13, 2020     (DE) ......................... 102020112988.2

(51) Int. Cl.
*H01M 8/1004*     (2016.01)
*C25B 9/23*     (2021.01)
(Continued)

(52) U.S. Cl.
CPC ............. *H01M 8/1004* (2013.01); *C25B 9/23* (2021.01); *C25B 9/77* (2021.01); *C25B 11/032* (2021.01);
(Continued)

(58) Field of Classification Search
CPC ...... H01M 8/1004; H01M 8/242; H01M 4/86; H01M 4/8636; H01M 4/88; H01M 4/8807; C25B 9/23; C25B 9/77; C25B 11/032
(Continued)

(56) References Cited

U.S. PATENT DOCUMENTS

2012/0141902 A1     6/2012   Hong et al.
2016/0064755 A1     3/2016   Hubner et al.

FOREIGN PATENT DOCUMENTS

DE     10 2010 041 604 A1     3/2012
DE     10 2011 006 651     1/2014
(Continued)

OTHER PUBLICATIONS

Hwanyeong Oh et al., "Effects of pore size gradient in the substrate of a gas diffusion layer on the performance of a proton exchange membrane fuel cell," available online Apr. 10, 2015, Applied Energy, vol. 149, Jul. 1, 2015, pp. 186-193 (Abstract only).
(Continued)

*Primary Examiner* — Kevin P Kerns
(74) *Attorney, Agent, or Firm* — DLA Piper LLP (US)

(57) ABSTRACT

A cell stack includes a plurality of single cells, wherein each single cell includes a membrane electrode assembly having a cathode, an anode, an interposed membrane, and an anode gas diffusion layer wherein a) in a single cell, the anode gas diffusion layer and a cathode gas diffusion layer are arranged in relation to one another such that a first thickness gradient of the anode gas diffusion layer and a second thickness gradient of the cathode gas diffusion layer run opposite to one another or b) in two or more single cells, the anode gas diffusion layers are arranged in relation to one another such that an overall thickness gradient of the anode gas diffusion layers is minimized and/or wherein in two or more single (Continued)

cells, the cathode gas diffusion layers are arranged such that an overall thickness gradient of the cathode gas diffusion layers is minimized.

10 Claims, 28 Drawing Sheets

(51) Int. Cl.

| | | |
|---|---|---|
| *C25B 9/77* | (2021.01) | |
| *C25B 11/032* | (2021.01) | |
| *H01M 4/86* | (2006.01) | |
| *H01M 4/88* | (2006.01) | |
| *H01M 8/242* | (2016.01) | |

(52) U.S. Cl.

CPC ....... *H01M 4/8636* (2013.01); *H01M 4/8807* (2013.01); *H01M 8/242* (2013.01)

(58) Field of Classification Search

USPC .................................................. 429/452, 463

See application file for complete search history.

(56) References Cited

FOREIGN PATENT DOCUMENTS

| EP | 3 089 251 A1 | 11/2016 |
|---|---|---|
| JP | 2005078983 A | 3/2005 |
| JP | 2018181536 A | 11/2018 |

OTHER PUBLICATIONS

International Search Report dated Jun. 24, 2021 in counterpart International Application No. PCT/EP2021/058262.

Written Opinion dated Jun. 24, 2021 in counterpart International Application No. PCT/EP2021/058262.

Notification of Reasons for Rejection dated Aug. 29, 2023, of counterpart Japanese Patent Application No. 2022-569277, along with an English translation.

Notification of Reasons for Rejection dated May 30, 2023, of counterpart Japanese Patent Application No. 2022-569277, along with an English translation.

Decision of Patent Grant dated Dec. 22, 2025, from counterpart South Korean patent application KR10-2022-7043499.

Office Action dated Feb. 26, 2026, from counterpart Chinese Application No. 202180034758.5.

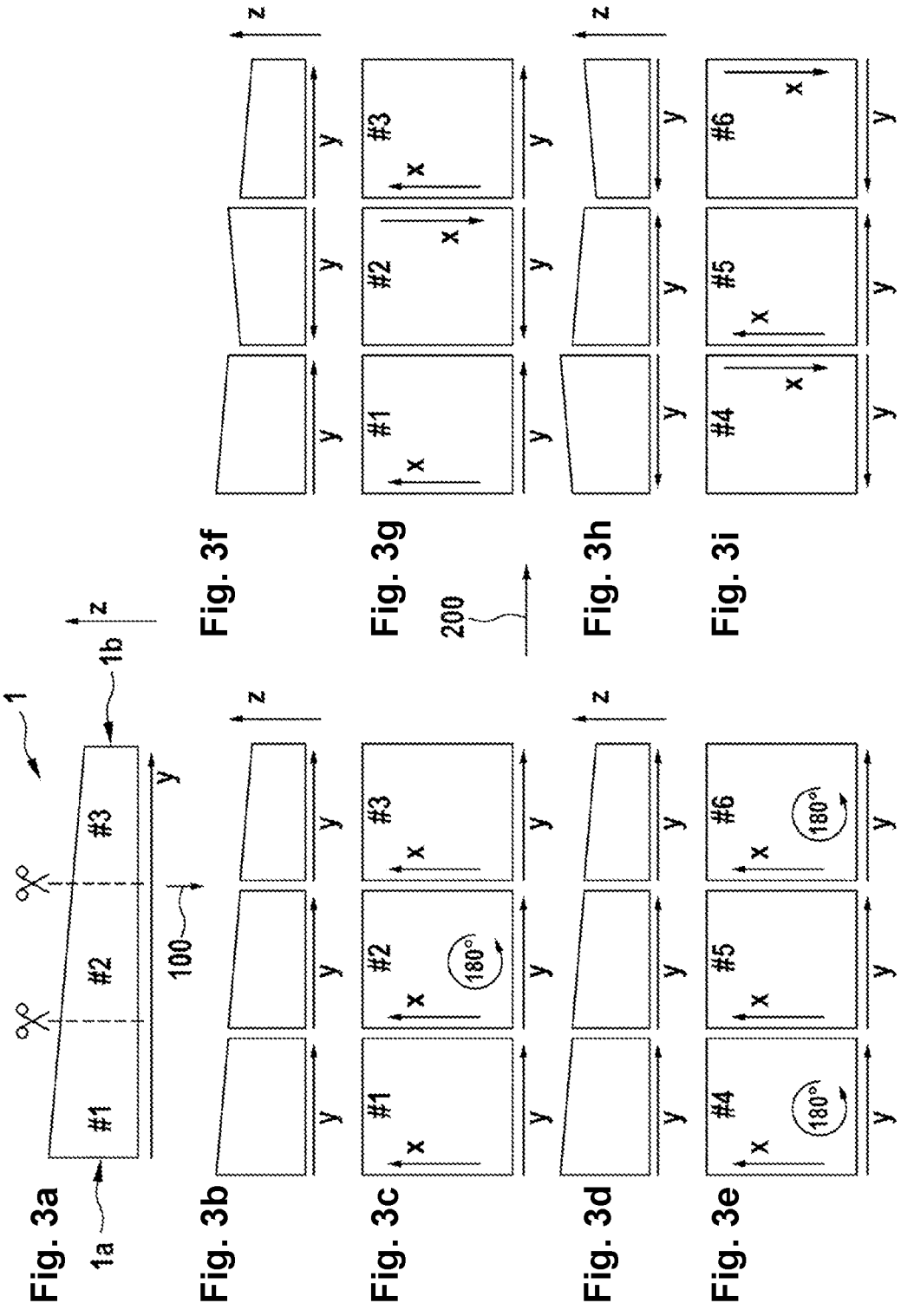

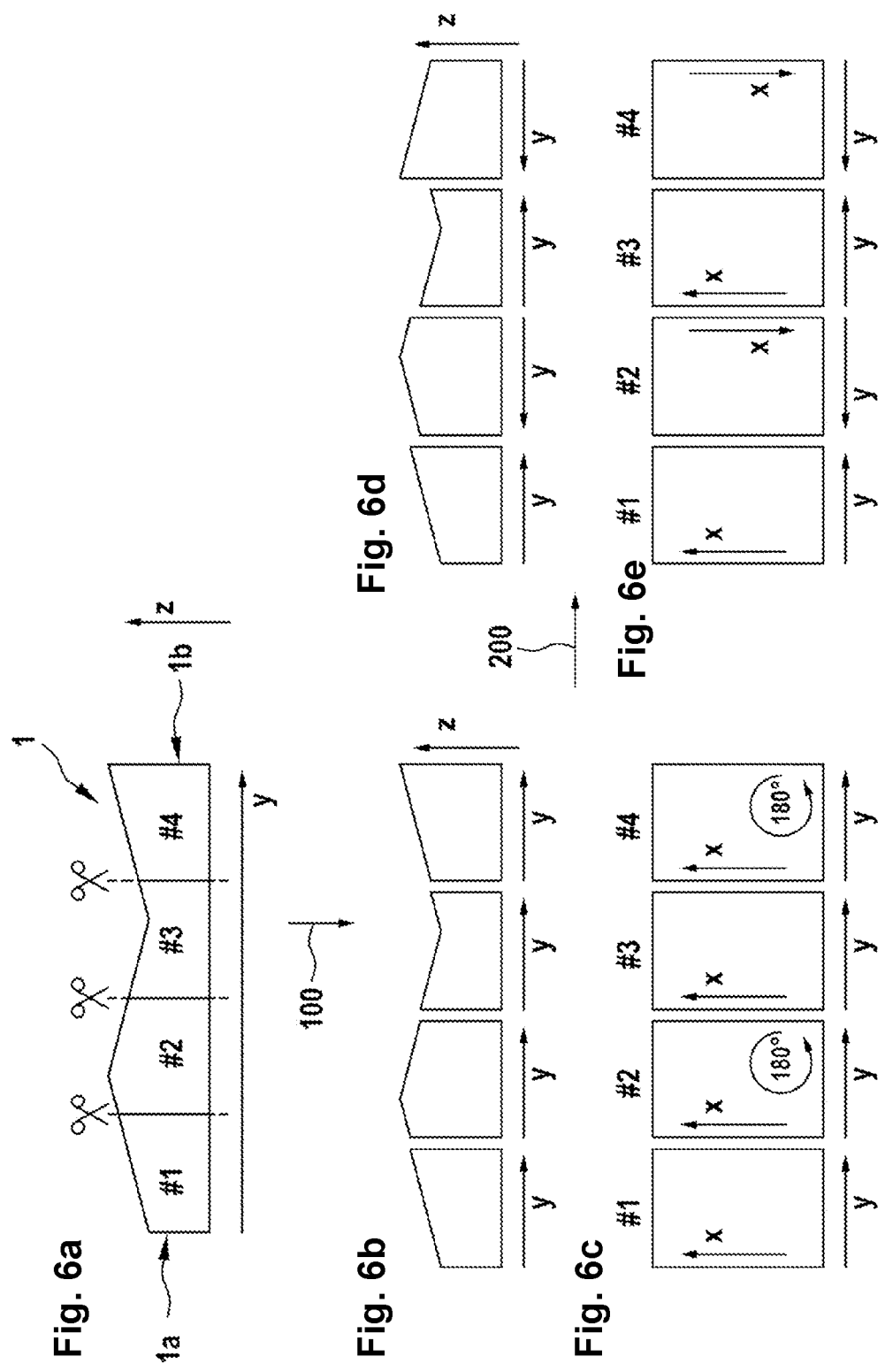

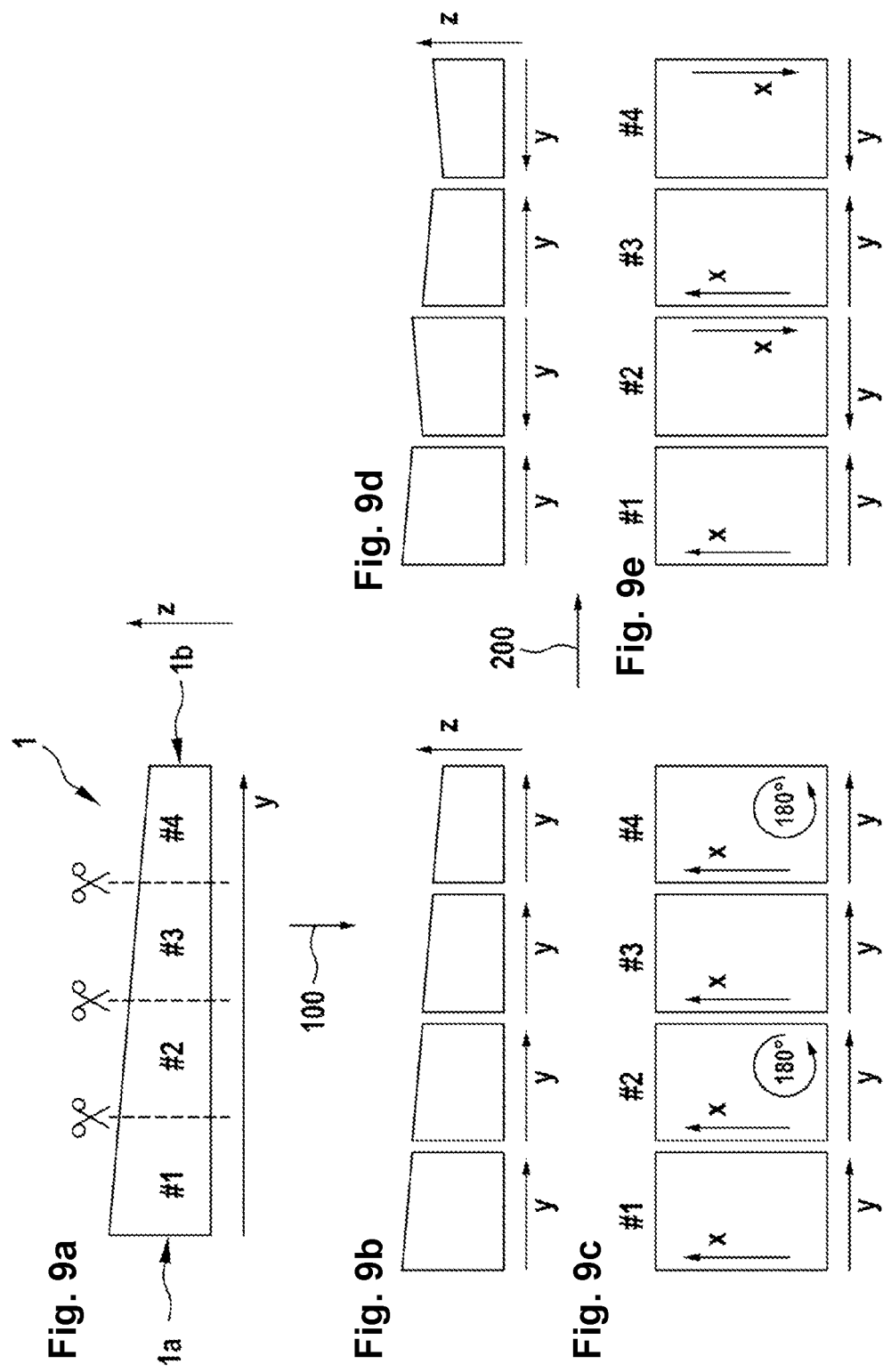

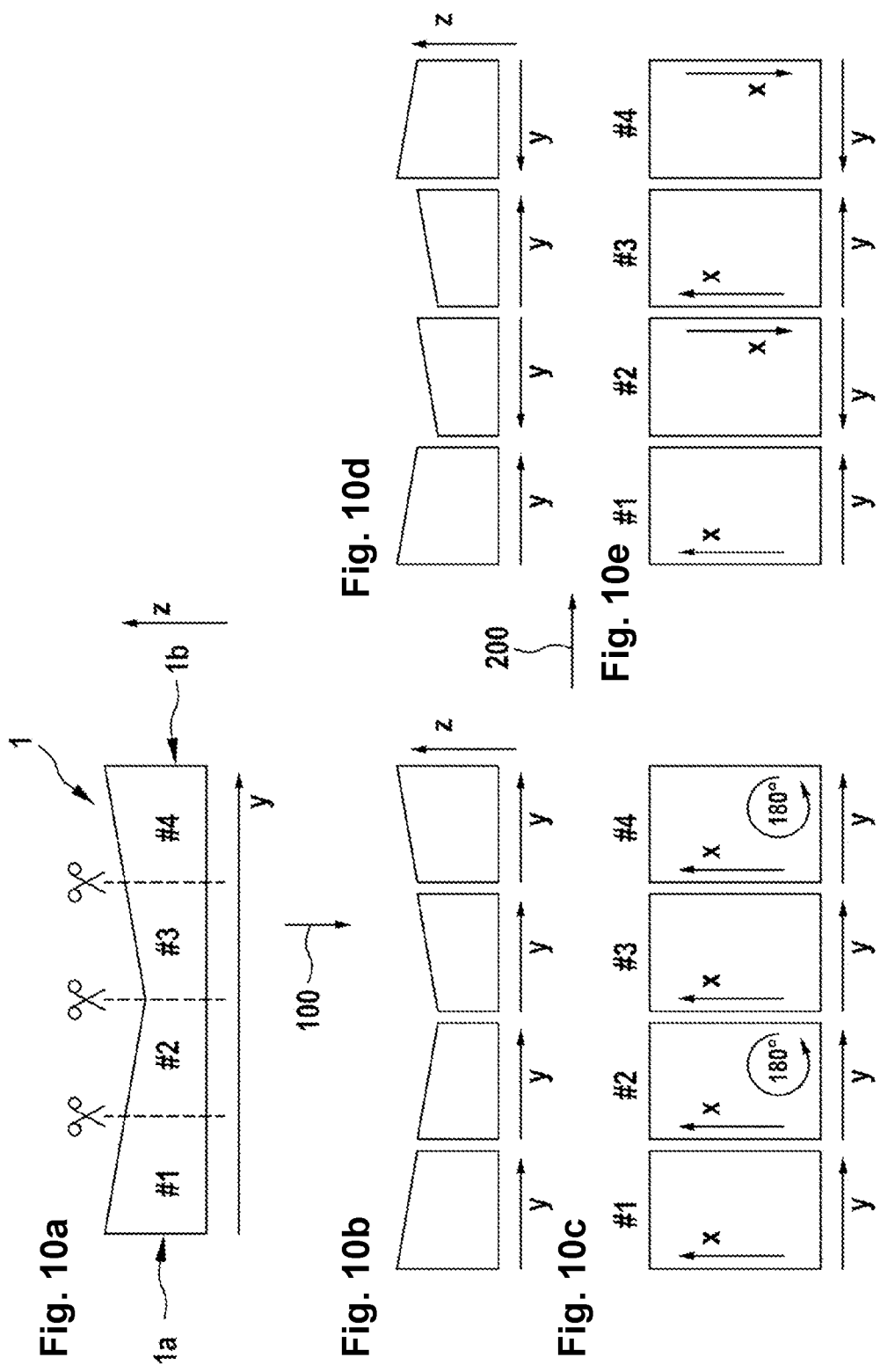

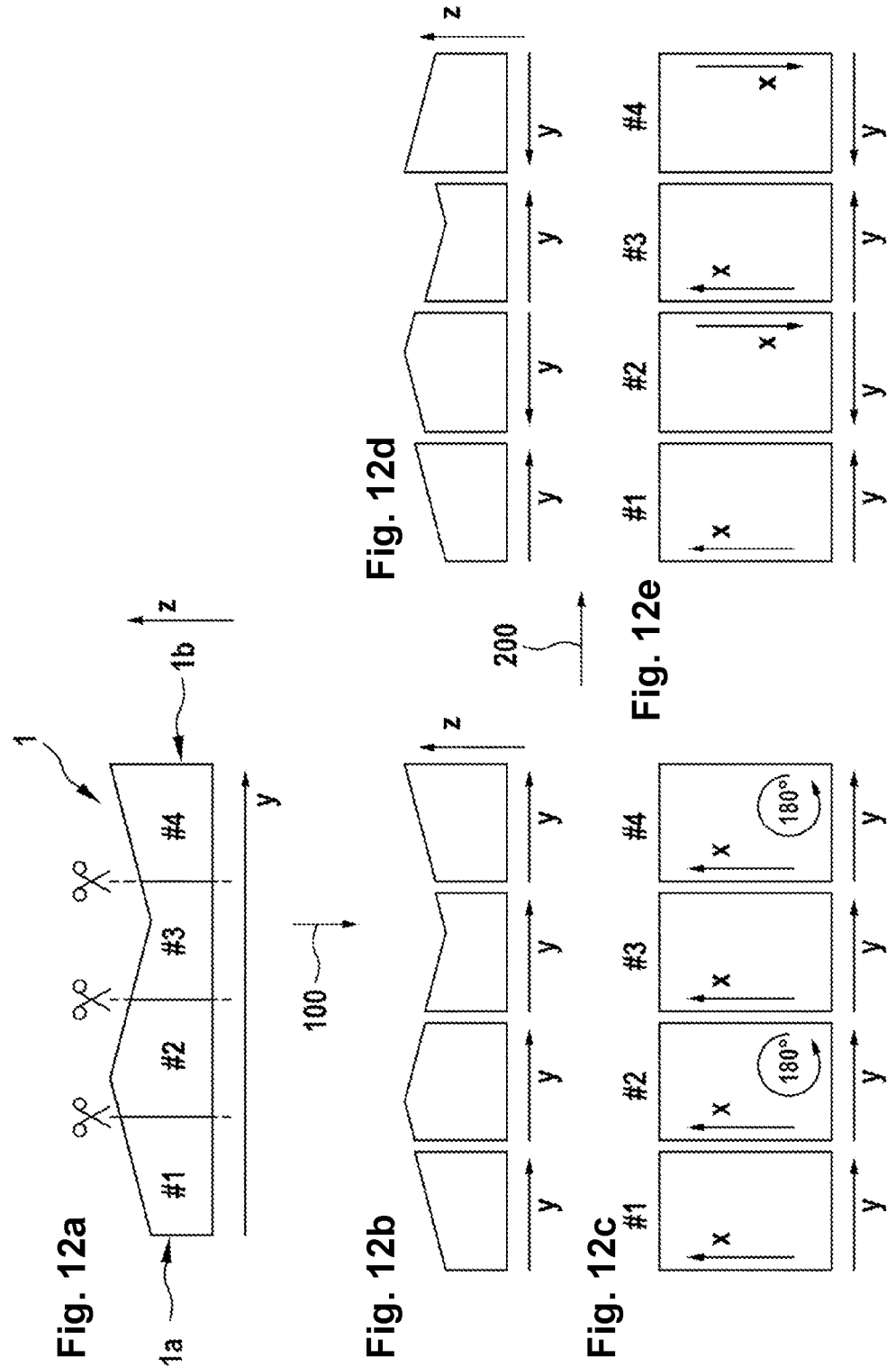

CELL STACK, METHOD OF PRODUCING A CELL STACK AND FUEL CELL OR ELECTROLYSIS CELL INCLUDING A CELL STACK

TECHNICAL FIELD

This disclosure relates to a cell stack having a uniform thickness distribution, a method of producing such a cell stack, and a fuel cell or an electrolysis cell comprising the cell stack.

BACKGROUND

Gas diffusion layers for electrochemical applications such as fuel cells in particular can have an uneven thickness distribution because of production. Exemplary thickness variations are linear thickness gradients, concave, convex, or wavy forms, which can prevail in at least one section of a gas diffusion layer. Gas diffusion layers are typically provided as rolled products having a longitudinal machine direction (the direction in which the roll is wound or unwound) and a transverse machine direction (the direction extending perpendicularly to the longitudinal machine direction and thus results in the width of the roll). Such gas diffusion layer rolls have a thickness variation because of production in particular in the transverse machine direction, wherein a thickness variation is understood as a thickness gradient in the layer thickness of a gas diffusion layer in the transverse machine direction. A thickness gradient of the gas diffusion layer results in an uneven thickness distribution within a single cell of a cell stack and thus in an uneven pressure distribution within the single cell and then within the cell stack. Due to the high layer thickness of the gas diffusion layers in comparison to the layer thicknesses of the remaining layers in a cell stack, an inhomogeneous thickness distribution of the gas diffusion layer is particularly critical. An uneven pressure distribution in turn results in uneven compression of the gas diffusion layers, by which properties such as contact resistance, mass transport, in particular of water and reactants within a cell, can be uneven, due to which stable operation cannot be ensured.

In addition, a systematic thickness gradient, in particular in the linear thickness gradients, in the use in the cell stack, thus in the concatenation of many single cells, which can comprise several hundred gas diffusion layers (GDL), results in total in a strongly pronounced uneven thickness distribution, by which assembling the cell stack is made more difficult or is even no longer possible.

It could therefore be helpful to provide a cell stack having the most uniform possible thickness distribution and a method of producing a cell stack having uniform thickness distribution, and a fuel cell or an electrolysis cell having permanently high and stable power density.

SUMMARY

We provide a cell stack including a plurality of single cells, wherein each single cell includes a membrane electrode assembly having a cathode, an anode, and an interposed membrane, as well as an anode gas diffusion layer arranged on the exposed side of the anode having a first thickness gradient in a transverse machine direction or a sintered titanium component and a cathode gas diffusion layer arranged on the exposed side of the cathode having a second thickness gradient in the transverse machine direction, wherein a) in a single cell, the anode gas diffusion layer and the cathode gas diffusion layer are arranged in relation to one another such that a first thickness gradient of the anode gas diffusion layer and a second thickness gradient of the cathode gas diffusion layer run opposite to one another or b) in two or more single cells, the anode gas diffusion layers are arranged in relation to one another such that an overall thickness gradient of the anode gas diffusion layers is minimized and/or wherein in two or more single cells, the cathode gas diffusion layers are arranged in relation to one another such that an overall thickness gradient of the cathode gas diffusion layers is minimized.

We also provide a method of producing a cell stack including a plurality of single cells, wherein each single cell includes a membrane electrode assembly having a cathode, an anode, and an interposed membrane, as well as an anode gas diffusion layer arranged on the exposed side of the anode, having a first thickness gradient in the transverse machine direction or a sintered titanium component and a cathode gas diffusion layer arranged on the exposed side of the cathode having a second thickness gradient in the transverse machine direction, wherein a) in a single cell, the anode gas diffusion layer and the cathode gas diffusion layer are arranged in relation to one another such that the first thickness gradient of the anode gas diffusion layer and the second thickness gradient of the cathode gas diffusion layer run opposite to one another or b) in two or more single cells, the anode gas diffusion layers are arranged in relation to one another such that an overall thickness gradient of these anode gas diffusion layers is minimized and/or wherein in two or more single cells the cathode gas diffusion layers are arranged in relation to one another such that an overall thickness gradient of these cathode gas diffusion layers is minimized.

BRIEF DESCRIPTION OF THE DRAWINGS

FIGS. 3a-3k show a method of producing a cell stack according to a second example.

FIGS. 6a-6g show a method of producing a cell stack according to a fifth example.

FIGS. 9a-9g show a method of producing a cell stack according to an eighth example.

FIGS. 10a-10f show a method of producing a cell stack according to a ninth example.

FIGS. 12a-12f show a method of producing a cell stack according to an eleventh example.

LIST OF REFERENCE SIGNS

Figure 1:
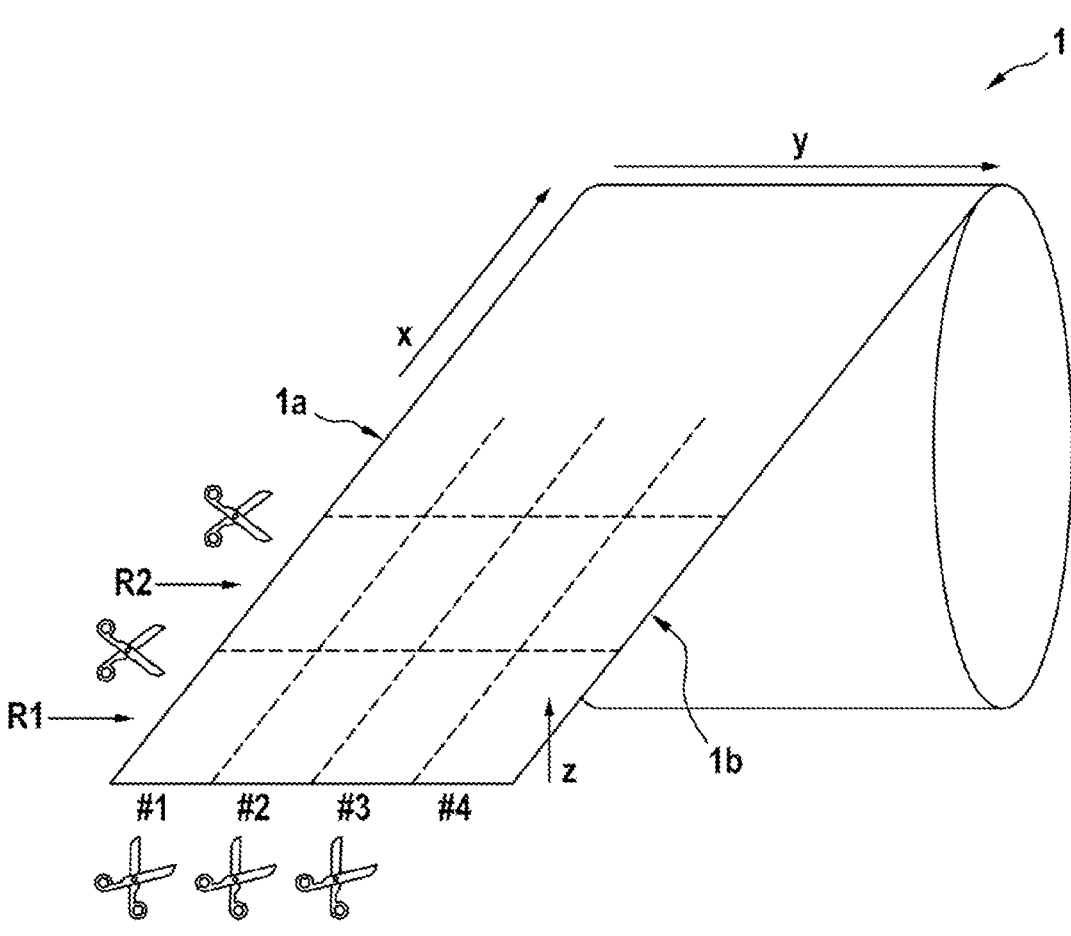
FIG. 1 shows a GDL rolled product.

1 GDL rolled product
1a first longitudinal edge of the GDL rolled product
1b second longitudinal edge of the GDL rolled product
2 cell stack
2a cell stack
3 membrane electrode assembly
4 anode
5 membrane
6 cathode
7 AGDL
8 KGDL
9 single cell
10 single cell
11 single cell
12 single cell
1 first GDL
2 second GDL
3 third GDL
4 fourth GDL
R1 GDL row
R2 GDL row
x longitudinal machine direction
y transverse machine direction
z layer thickness direction

DETAILED DESCRIPTION

We provide a cell stack, which comprises a plurality of single cells, wherein each single cell comprises a membrane electrode assembly having a cathode, an anode, and an interposed membrane, as well as an anode gas diffusion layer (AGDL) arranged on the exposed side of the anode, thus on the side of the anode facing away from the membrane, and a cathode gas diffusion layer (KGDL) arranged on the exposed side of the cathode, thus also on the side of the cathode facing away from the membrane. Alternatively to an anode gas diffusion layer, a sintered titanium component, a so-called titanium sinter, can also be provided, as is often typical for electrolysis cells. In this example, however, at least one KGDL is provided.

Both the KGDL and also the AGDL (if provided) each have a thickness gradient in the transverse machine direction, wherein the thickness gradient of the AGDL is a first thickness gradient and the thickness gradient of the KGDL is a second thickness gradient. A thickness gradient in the transverse machine direction is understood as a layer thickness of the corresponding gas diffusion layer (GDL) changing locally in the direction of the transverse machine direction.

The transverse machine direction is the direction extending perpendicularly to an unrolling direction or rolling direction of GDL provided as rolled products. The gas diffusion layer product is produced and provided as a rolled product. This means that the layers of the GDL are initially contiguous before the isolation to form GDL and are provided in the form of a type of carpet both adjacent to one another in a row along the width of the GDL rolled product and also in corresponding rows in succession. The rolling direction or unrolling direction of this carpet is the longitudinal machine direction. The transverse machine direction extends perpendicularly to the longitudinal machine direction and is thus also to be compared to the width of the rolled product. A GDL is thus spanned in the longitudinal machine direction and also in the transverse machine direction and has a certain layer thickness which extends perpendicularly to the longitudinal machine direction and to the transverse machine direction.

If a GDL is observed in the transverse machine direction, its layer thickness in this direction thus has a thickness gradient. The layer thickness thus changes along the transverse machine direction, specifically at least in a section of the observed GDL.

In a single cell, the AGDL and the KGDL are arranged in relation to one another so that the first thickness gradient of the AGDL and the second thickness gradient of the KGDL run opposite to one another. The thickness distribution within this single cell thus balances out or the thickness differences preferably mutually cancel out. Pressure differences can thus be reduced within the single cell and even minimized so that a pressure distribution within the layers of the single cell is homogeneous and pressure peaks are avoided. This furthermore has the result that the single cell can permanently provide a high power density.

Alternatively, the AGDL are arranged in relation to one another in two or more single cells such that a total thickness gradient of this AGDL is minimized. This means that if one observes the cell stack only on the anode side, the AGDL having its first thickness gradients are arranged such that thickness differences which originate from the first thickness gradient equalize. Therefore, the thickness distribution in a single cell is not remedied, rather all AGDL of the anode side are specifically aligned and arranged with regard to a thickness compensation, in other words a compensation of the first thickness gradient. The cell stack thus has the most homogeneous possible thickness variation on the anode side, by which pressure differences, for example, during the assembling of the cell stack, can be reduced or even prevented on the anode side. This also contributes to an improvement of the power density of the cell stack.

For the above-mentioned reasons, it is alternatively or additionally provided that in two or more single cells the KGDL are arranged in relation to one another so that a total thickness gradient of these KGDL is minimized. Therefore, all KGDL to be used in the cell stack are aligned with respect to their respective thickness gradients such that the thickness differences are minimized over all KGDL.

It is particularly advantageous for the power density of the cell stack if both the AGDL and also the KGDL are each aligned such that their total thickness gradients are minimized.

Advantageously, in all single cells of the cell stack, the AGDL and the KGDL may each be arranged in relation to one another such that the first thickness gradient of the AGDL and the second thickness gradient of the KGDL of each single cell run opposite to one another. An arbitrary number of single cells can thus be stacked one on top of another to form a cell stack, wherein because the thickness gradients per single cell are minimized and thus equalized, the cell stack also has a minimized thickness variation and thus pressure differences between the layers of the single cells can be reduced and even prevented. This improves the permanent power density of the cell stack.

Further advantageously, the first thickness gradient of the AGDL and the second thickness gradient of the KGDL can be linear. This means that both thickness gradients have a constant slope, the layer thickness of the GDL thus decreases or increases consistently at least in a section of the GDL. Thickness differences or thickness variations in the cell stack may be equalized particularly easily in this way so that pressure differences in the cell stack can be significantly reduced, which contributes to the stability and permanently high power density of the cell stack.

Furthermore, the AGDL and the KGDL each advantageously comprise a microporous layer and a macroporous carrier material, wherein the microporous layer of the AGDL is oriented to the anode and the microporous layer of the KGDL is oriented to the cathode. The use of a microporous layer permits a particularly advantageous mass transport and thus a particularly advantageous supply of the anode with reaction gases (in a fuel cell: hydrogen for the anode and oxygen for the cathode). Furthermore, the use of a microporous layer reduces the contact resistance between a catalyst-coated membrane and a GDL.

The microporous layer can in particular contain defined quantities of polytetrafluoroethylene (PTFE) in this example, to influence the hydrophobic properties of the microporous layer, by which the draining behavior of water formed or contained in the single cell can be controlled. A carbonaceous material can also be included, for example, carbon black or graphite, via which the hydrophobic and hydrophilic properties of the microporous layer can also be controlled. Inter alia, paper-type and fleece-type materials are advantageous as carrier materials, which can be formed from carbonized polyacrylonitrile fibers in particular having an average diameter of 7 μm. The microporous layer is distinguished, in comparison to the carrier material, by a significantly smoother surface and structure, which enables very good contacting of the electrode (cathode or anode), which results in a low electrical resistance.

Further advantageously, we provide that the AGDL and/or the KGDL of a single cell may have a layer thickness of 100 μm to 300 μm. Due to the relatively large layer thickness of the GDL in relation to the layer thicknesses of the further components of the membrane electrode assembly (MEA), a very good flow field can be provided for the reaction gases, which enables a homogeneous distribution of the reaction gases. The layer thickness of a GDL is defined here as a mean value of 10 measured values, which are ascertained at equal intervals at a defined measurement pressure of 1 MPa over the entire width of the GDL.

The carrier material is preferably selected from a fleece-type and a paper-type.

The membrane electrode assembly is further advantageously circumferentially framed by an edging material. The edging material can comprise a carrier film and an adhesive layer here, which ensure very good gas tightness of the composite made up of edging material and MEA. Furthermore, the edging material protects the MEA in particular in the region of the GDL edges from GDL fibers, which can pierce the MEA and can thus cause an electrical short circuit. An electrical short circuit results in a reduced service life or a total failure of the MEA.

A fuel cell or an electrolysis cell are further advantageously also described, which comprise a cell stack as disclosed above. Due to the use of the cell stack, which is distinguished by balanced thickness differences, the fuel cell or the electrolysis cell also has a homogeneous thickness, by which a permanently high power density can be achieved.

A method of producing a cell stack is also described likewise. The cell stack is designed as described above and comprises a plurality of single cells, wherein each single cell comprises an MEA having a cathode, an anode, and an interposed membrane, as well as an AGDL arranged on the exposed side of the anode having a first thickness gradient in the transverse machine direction or a sintered titanium component and a KGDL arranged on the exposed side of the cathode having a second thickness gradient in the transverse machine direction. The method is suitable for producing the cell stack.

According to the method, in at least one single cell and in particular in all single cells, the AGDL and the KGDL per single cell are arranged in relation to one another such that the first thickness gradient of the AGDL and the second thickness gradient of the KGDL run opposite to one another. In this way, thickness differences or thickness variations in the GDL can be equalized so that each single cell which has passed through this step has an equalized uniform thickness distribution. Single cells having uniform layer thickness distribution can thus be stacked one on top of another, without punctiform or local pressure stresses occurring. Rather, pressure peaks are avoided during the stacking of the single cells so that damage in the layers of the single cells due to active pressures are avoided. A cell stack produced in this way is distinguished by a permanently high power density.

Alternatively, in two or more single cells, the AGDL may be arranged in relation to one another such that an overall thickness gradient of these AGDL is minimized. The AGDL are advantageously thus aligned before the assembling of the single cells to form the cell stack such that when one only observes the anode side of the cell stack, a uniform thickness distribution of the AGDL results so that thickness variations are avoided and equalized. A pressure applied to the cell stack thus acts uniformly on all included layers, by which damage within the layers is avoided.

Alternatively or additionally, for the above-mentioned reasons, in two or more single cells, the KGDL may be arranged in relation to one another such that an overall thickness gradient of these cathode gas diffusion layers is minimized.

In particular if the respective GDL are aligned in relation to one another on the cathode side and on the anode side such that thickness differences are minimized, a cell stack having particularly uniform layer arrangement can be obtained, which is stable with respect to acting pressures, which are distributed uniformly over the entire surface of the layers so that a permanently particularly high power density can be obtained in the cell stack.

The gas diffusion layers (KGDL and AGDL) are advantageously provided as rolled products and singularized to form GDL after the unrolling, wherein for the isolation of the gas diffusion layers GDL are removed in succession from a roll in the transverse machine direction and GDL removed in succession are used such that each second removed GDL is rotated by 180° relative to the transverse machine direction, and the non-rotated and rotated GDL are alternately used as AGDL and KGDL. In other words, this means that GDL are taken from an unrolled surface of the rolled product, for example, by cutting or stamping out or any other isolation process. A procedure is used here such that the rolled product is unrolled at least enough that the length of the GDL to be singularized is exposed. A first GDL is thus singularized beginning at a longitudinal edge of the unrolled rolled product in the extension direction of the second longitudinal edge, thus over the width of the roll. Subsequently thereto, a second GDL is singularized in the direction of the second longitudinal edge. This singularization is then continued until the second longitudinal edge is reached. A next row is then started beginning again from the first longitudinal edge to the second longitudinal edge and a further GDL is singularized and so forth.

For the above example there are in principle two possibilities after the isolation of the GDL:

According to a first possibility, the respective singularized GDL are stacked one on top of another, thus, for example, a fourth GDL from a first row in the transverse machine direction over a third GDL from the first row in the transverse machine direction, the third GDL over the second GDL from a first row in the transverse machine direction, and lowermost the first GDL from the first row in the transverse machine direction. A GDL stack results, wherein each second GDL is rotated by 180° relative to the transverse machine direction in the stack.

According to a second possibility, the rotation of each second GDL by 180° relative to the transverse machine direction can also first take place during the stacking of the layers to form a single cell.

It is important that in both possibilities, of GDL taken in succession from the GDL roll, each second one is rotated by 180° so that nonrotated and rotated GDL are used alternately as AGDL and KGDL in the same single cell.

The above configuration will be illustrated on the basis of an example. Assuming that four GDL can be singularized in succession over the entire width of a GDL roll and the GDL roll has a linear thickness gradient in the transverse machine direction, the four GDL singularized in succession in the transverse machine direction thus each have the same constant slope. In this configuration, these are a first GDL, a second GDL, a third GDL, and a fourth GDL. The second and the fourth GDL are rotated by 180° in the transverse machine direction. These four GDL are, for example, stacked one on top of another and provided for further processing. The fourth GDL is laid over the third GDL, the third GDL over the second GDL, and the second GDL over the first GDL. Due to the rotation by 180° in the transverse machine direction of the second and fourth GDL, the thickness gradients of the four GDL stacked one on top of another equalize. If these four GDL are now used in a cell stack, the following possibilities result:

In a first example, for a first single cell, the fourth GDL can be used, for example, as an AGDL and the third GDL as a KGDL. A single cell is thus obtained in which thickness differences of the GDL are minimized and, due to the same slope of the layer thicknesses of the GDL, are even canceled out.

In a second example, for example, all four GDL can be used as AGDL on the respective anode side of four single cells. Due to the rotation of the second and fourth GDL by 180° in the transverse machine direction, the thickness differences also equalize in the cell stack on the anode side. In other words, the thickness gradients cancel out.

In a third example, for example, all four GDL can be used as KGDL on the respective anode side of four single cells. Due to the rotation of the second and fourth GDL by 180° in the transverse machine direction, the thickness differences also equalize in the cell stack on the cathode side. In other words, the thickness gradients cancel out.

In a fourth example, two GDL lying one on top of another can each be used in two single cells on the anode side and on the cathode side. Therefore, one GDL per anode side and one GDL per cathode side is located in the original state, thus nonrotated, and one GDL per anode side and one GDL per cathode side is rotated by 180° in the machine direction so that the thickness gradients of the GDL cancel out on both the anode side and the cathode side, by which a cell stack having minimized thickness variation and thus permanently high power density is obtained. Pressures acting on the cell stack are distributed uniformly over all layers so that pressure peaks are precluded.

The above example can be carried out for an arbitrary number of singularized GDL, wherein the last GDL in each example, which could be singularized in the transverse machine direction up to the second longitudinal edge, is adjoined by a first GDL in each example, which can be singularized in the transverse machine direction beginning from the first longitudinal edge, in a new row in the longitudinal direction of the roll. The rotation of the GDL in the transverse machine direction can either take place directly after the isolation of the GDL from the rolled products, thus before any possible stockpiling, or also first during the stacking of the individual layers to form a cell stack.

Further advantageously, a configuration is characterized in that the gas diffusion layers are provided as rolled products and singularized to form GDL, wherein to singularize the GDL, GDL are removed in succession from a roll in the transverse machine direction and GDL removed in succession are each stacked one on top of another, wherein each second one of the GDL to be stacked or stacked one on top of another is rotated by 180° relative to the transverse machine direction and GDL stacked one on top of another are used as AGDL or KGDL of single cells of the cell stack arranged one on top of another. As already described above, the rotation of the GDL in the transverse machine direction can either take place directly after the isolation of the GDL from the rolled products, thus before any possible stockpiling, or also first during the stacking of the individual layers to form a cell stack. In both configurations, upon use of the singularized GDL and stacking thereof (including a rotation of each second GDL by 180° in the transverse machine direction) either on anode sides of the cell stack (use of the GDL as AGDL) or on cathode sides of the cell stack (use of the GDL as KGDL), an equalization of the thickness differences in the cell stack is achieved so that pressure peaks can be reduced or even prevented.

Advantageously, the GDL may be provided as a rolled product and singularized to form GDL, wherein to singularize the GDL, GDL are removed in succession from a roll in the transverse machine direction and GDL removed in succession are each stacked one on top of another. In this example, however, GDL are ascertained via a random generator which are then rotated by 180° relative to the transverse machine direction, wherein rotation or non-rotation have the same probability. This has the result that the AGDL and the KGDL can be rotated in random sequence and thus viewed statistically can be arranged such that the first thickness gradient and the second thickness gradient cancel out or thickness differences are reduced. A cell stack having little thickness difference is also obtained in this way. The layers rest flatly on one another so that no pressure peaks occur locally within the layers. Due to the finite number of cells within a cell stack, the actual number of rotation and nonrotation can be unequal to one another and can be within 45% to 55%. The rotation of the GDL can take place here, for example, during depositing following the isolation of the GDL from the rolled products, or also first during stacking of the layers for the cell stack.

Further details, advantages, and features result from the following description of examples on the basis of the drawings.

In the figures, only the essential features are shown. All other features are omitted for the sake of clarity. Furthermore, identical reference signs identify identical features/components.

FIG. 1 shows in detail a GDL rolled product 1, which means that the material of the GDL was produced having a specific width and length and was rolled up to form a roll 1. In this example, it is indicated that, for example, in the transverse machine direction y per row R1, R2, etc. viewed in the longitudinal machine direction x, four GDL can be singularized adjacent to one another in each example. The GDL roll 1 has a first longitudinal edge 1a and a second longitudinal edge 1b.

Figures 2A, 2B, 2C, 2D, 2E:
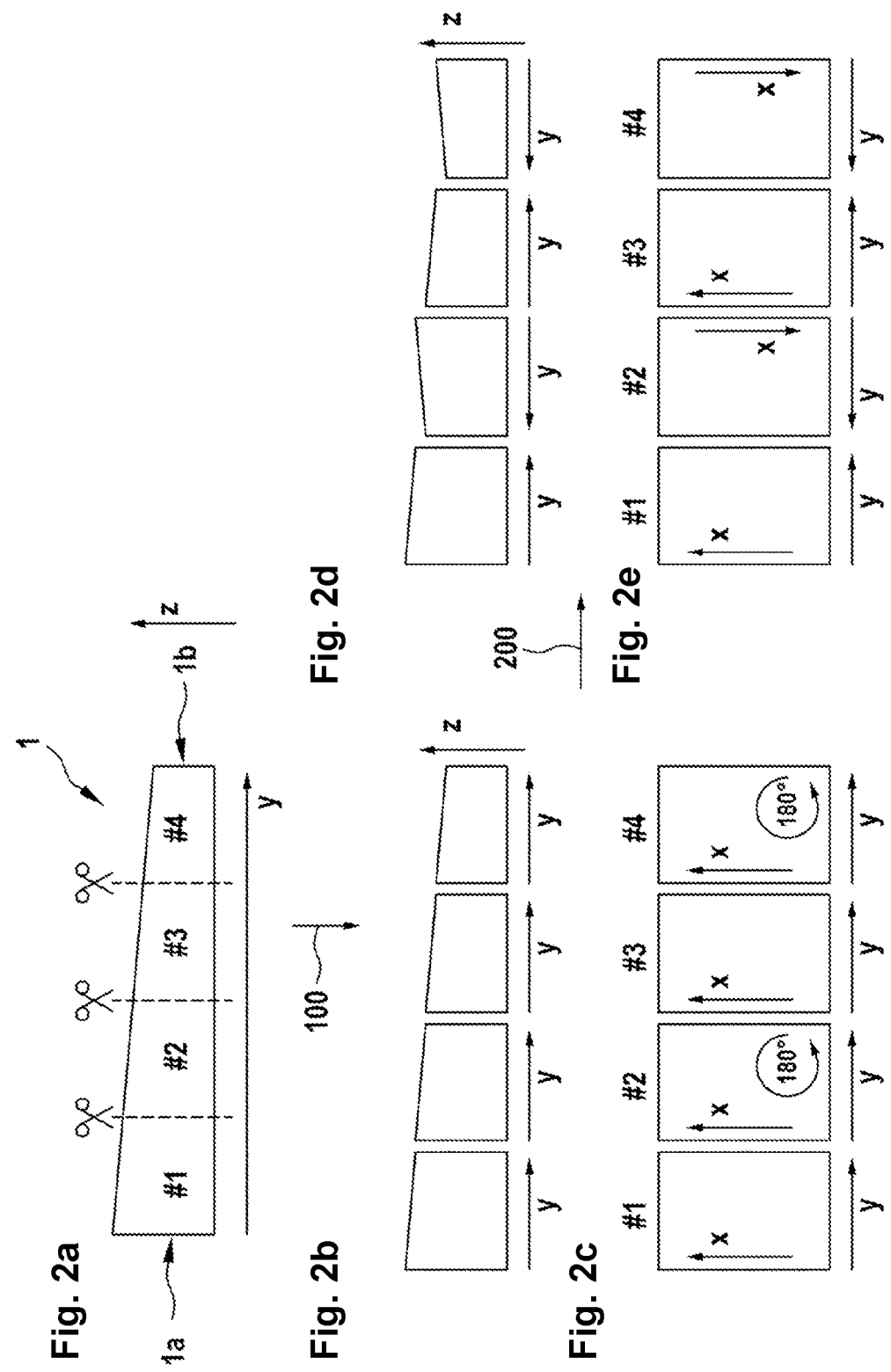
FIGS. 2a-2g show a method of producing a cell stack according to a first example.

FIG. 2a shows a view of the GDL material unrolled from the roll 1. It can be seen that the GDL material and thus also all GDL #1, #2, #3, and #4 to be singularized have a thickness gradient in the layer thickness direction z. In this example, it is a linear thickness gradient, thus a layer thickness change in layer thickness direction z, which is distinguished over the entire transverse machine direction y by a constant slope. The slope of all GDL #1-#4 arranged in the transverse machine direction y thus has the same slope and thus the same layer thickness reduction in the transverse machine direction y.

If the GDL material is now singularized in method step 100 to form four GDL #1-#4, as shown in FIG. 2b, four separate GDL #1-#4 are thus obtained, wherein #1 has the greatest layer thickness in absolute terms and #4 has the least layer thickness in absolute terms, but the respective thickness gradient, thus the slope at which the layer thickness decreases in the transverse machine direction y, is the same in all four GDL #1-#4. FIG. 2b shows in this example the singularized GDL #1-#4 as a sectional view, in section along the transverse machine direction y.

FIG. 2c shows a top view of the singularized GDL #1-#4. The GDL #1-#4 are shown spanned in the longitudinal machine direction x and transverse machine direction y. Now, in method step 200, the second GDL #2 and the fourth GDL #4 are rotated by 180° in the transverse machine direction y. This results in the view of the GDL #1-#4 in FIGS. 2d and 2e, wherein FIG. 2d again shows a side view of the GDL #1-#4, thus a view in section in the transverse machine direction y similar to FIGS. 2b and 2e again shows a top view of the GDL #1-#4, similar to FIG. 2c.

It can be seen in particular in FIG. 2d how the gradient profile is in the layer thickness direction z of the rotated GDL #2 and #4 and the nonrotated GDL #1 and #3.

If the nonrotated GDL #1 and #3 and the rotated GDL #2 and #4 from FIGS. 2d and 2e are now used for the production of a cell stack 2 in the sequence #1, #2, #3, #4, an MEA 3, which comprises an anode 4, a cathode 6, and an interposed membrane 5, between an AGDL 7, which corresponds to #1 or #3, and a KGDL 8, which corresponds to #2 or #4, is assembled. The respective layers are stacked one on top of another here in the transverse machine direction y. Viewed in the layer thickness direction z, the arrangement results as shown in FIG. 2f. The GDL #1-#4 are stacked on one another in succession in the transverse machine direction y. Two single cells 9, 10 are shown, which can be stacked to form the cell stack 2.

It is apparent from FIG. 2f that the 180° rotation of the second GDL #2 and the fourth GDL #4 is advantageous for the assembly into the single cells 9 and 10. This means that the thickness differences of the GDL #1-#4 cancel out after assembly to form single cells 9, 10. This has the result that the thickness differences also cancel out in the cell stack 2 by assembly of the single cells 9, 10.

In other words, in each single cell 9, 10, the AGDL 7 and the KGDL 8 are arranged in relation to one another such that the first thickness gradient of the AGDL 7 and the second thickness gradient of the KGDL 8 run opposite to one another and thus cancel out.

A uniform thickness distribution and thus pressure distribution therefore results over all layers of the cell stack 2 so that the power density of the cell stack 2 is permanently very high.

Figure 2G:
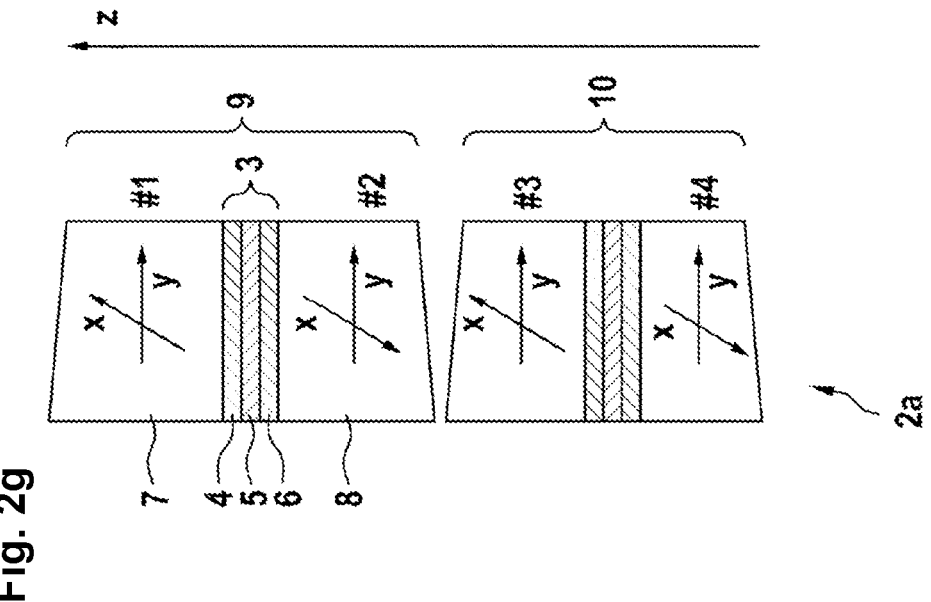
Figure 2F:
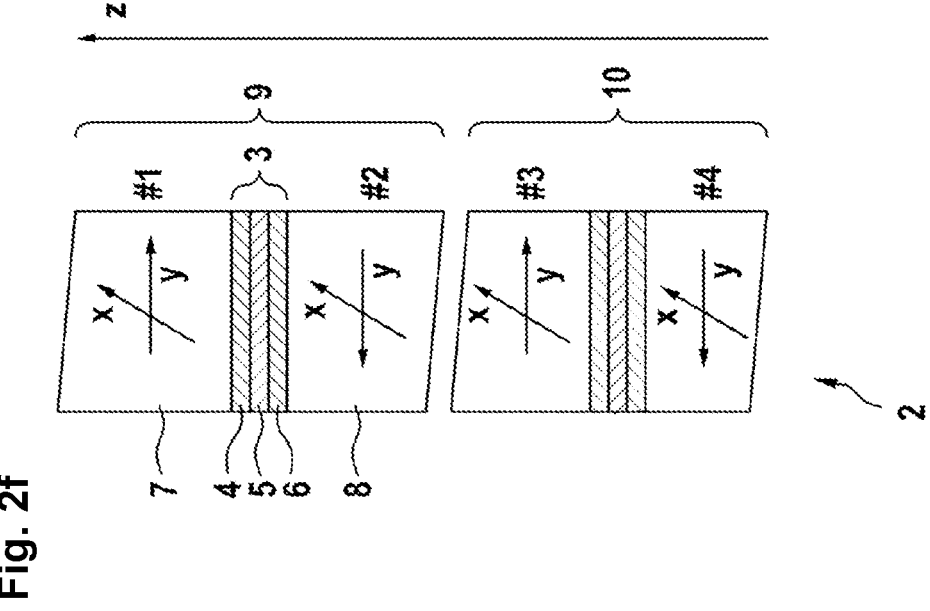

FIG. 2g shows an example in which the GDL #1-#4 from FIGS. 2b and 2c, thus the GDL in the nonrotated state, are assembled to form a cell stack 2a having two single cells 9, 10. It can be seen here that the thickness differences are not canceled out or minimized in the single cell 9, 10 or in the cell stack 2a. Rather, there are significant thickness variations due to the first thickness gradient of the AGDL 7 and the second thickness gradient of the KGDL 8.

A uniform pressure distribution thus cannot result over all layers of the cell stack 2a so that the power density of the cell stack 2a is reduced.

FIG. 3 illustrates a method of producing a cell stack according to a second example. Like the GDL rolled product already in FIG. 2, the GDL rolled product 1 also has a thickness gradient in the transverse machine direction y, wherein the layer thickness of the GDL rolled product 1 changes continuously at constant slope from a first longitudinal edge 1a to a second longitudinal edge 1b.

In contrast to FIG. 2, per row R1 and R2, in each configuration three GDL #1, #2, and #3 and #4, #5, and #6 are singularized. FIGS. 3b and 3c each show the three singularized GDL #1-#3 from the first row R1 in a side view (cross section in the transverse machine direction y) and in a top view (top view of the respective GDL spanned in the longitudinal machine direction x and transverse machine direction y). FIGS. 3d and 3f each show the three singularized GDL #4-#6 from the second row R2 in a side view (cross section in the transverse machine direction y) and in a top view (top view of the respective GDL spanned in the longitudinal machine direction x and transverse machine direction y).

In method step 200, again each second GDL (#2, #4, and #6) is rotated in the transverse machine direction y by 180°. The views of the GDL #1-#6 as shown in FIGS. 3f, 3g, 3h, and 3i result in this way.

Figure 3K:
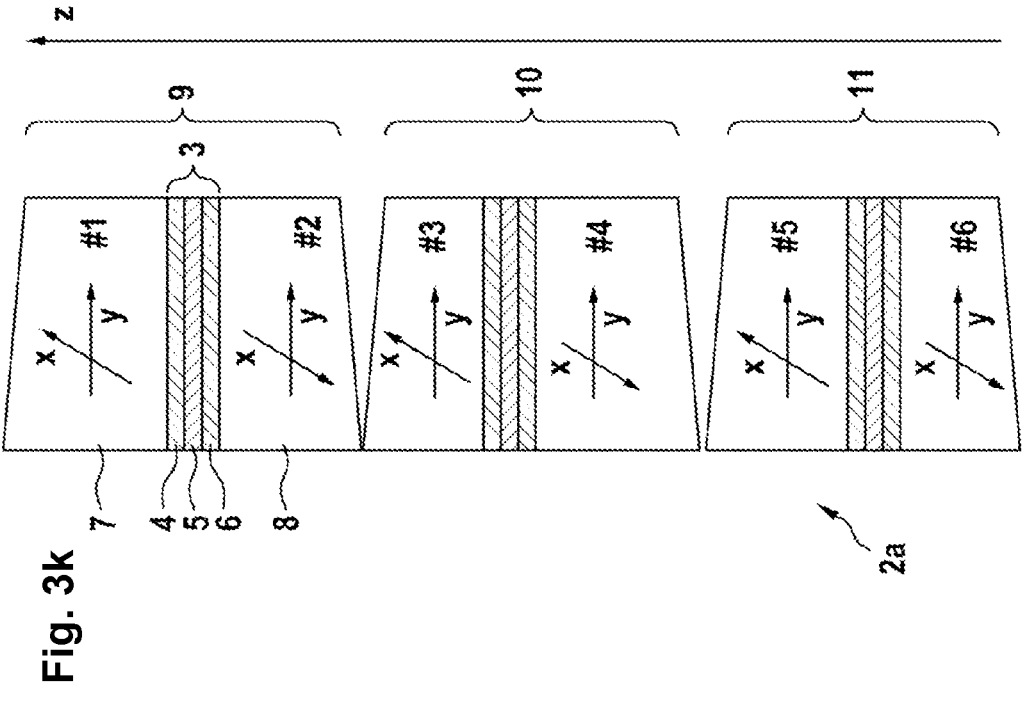
Figure 3J:
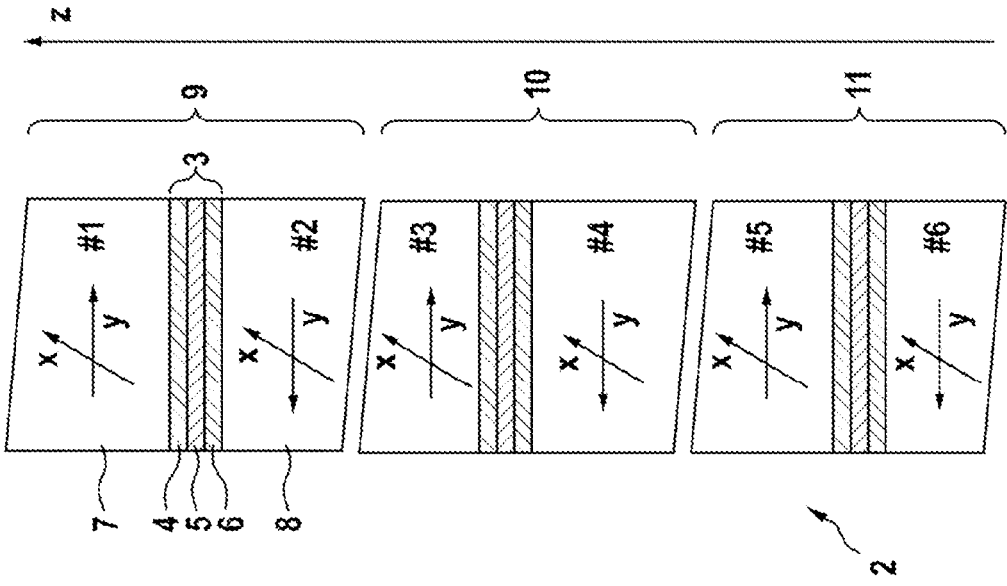

FIG. 3j shows a cell stack 2 after assembly of three single cells 9, 10, and 11, wherein each single cell comprises a membrane electrode assembly 3 having an anode 4, a cathode 6, and an interposed membrane 5 and also an AGDL 7 on the anode side and a KGDL 8 on the cathode side. Single cell 9 has as the AGDL 7 GDL #1 (not rotated) and as the KGDL 8 GDL #2 (rotated). Single cell 10 has as the AGDL 7 GDL #3 (not rotated) and as the KGDL 8 GDL #4 (rotated). Single cell 11 has as the AGDL 7 GDL #5 (not rotated) and as the KGDL 8 GDL #6 (rotated).

Each single cell 9 to 11 thus has a GDL which was rotated by 180° in the transverse machine direction y so that the first thickness gradient of the AGDL of a single cell and the second thickness gradient of the KGDL extend in opposite directions so that the thickness differences per single cell cancel out.

It can also be seen from FIG. 3j that the thickness differences or thickness variations in the transverse machine direction also cancel out in the cell stack 2 so that the same pressure acts on all layers of the cell stack 2 and pressure peaks can be avoided. The power density of the cell stack 2 is thus also permanently high.

FIG. 3k shows the configuration in which the GDL #1-#6 from FIGS. 3b, 3c, 3d, and 3e, thus the GDL in the nonrotated state, are assembled to form a cell stack 2a having three single cells 9, 10, and 11. It can be seen here that the thickness differences are not canceled out or minimized in the single cell 9, 10, or 11 or in the cell stack 2a.

Rather, there are significant thickness variations due to the first thickness gradient of the AGDL 7 and the second thickness gradient of the KGDL 8.

A uniform pressure distribution therefore cannot result over all layers of the cell stack 2a so that the power density of the cell stack 2a is reduced.

FIG. 4 illustrates a method of producing a cell stack according to a third example.

In this example, the GDL rolled product 1 has a concave shape in the transverse machine direction y. Along the transverse machine direction, the GDL rolled product 1 thus has two thickness gradients, which extend in opposite directions, from one longitudinal edge 1a to the other longitudinal edge 1b. From the first GDL #1 to the second GDL #2, the slope decreases in the layer thickness direction z and from the third GDL #3 to the fourth GDL #4, the slope increases in the layer thickness direction z. If this GDL rolled product 1 is now singularized into GDL in the form such that per row four GDL #1, #2, #3, and #4 are singularized, their cutting pattern thus results as shown in FIGS. 4b and 4c, wherein FIG. 4b, similarly to FIGS. 2b and 3b, again shows a sectional view in the transverse machine direction y and FIG. 4c, similarly to FIGS. 2c and 3c, shows a top view of the GDL #1-#4 spanned in the longitudinal machine direction x and transverse machine direction y.

Figures 4A, 4B, 4C, 4D, 4E:
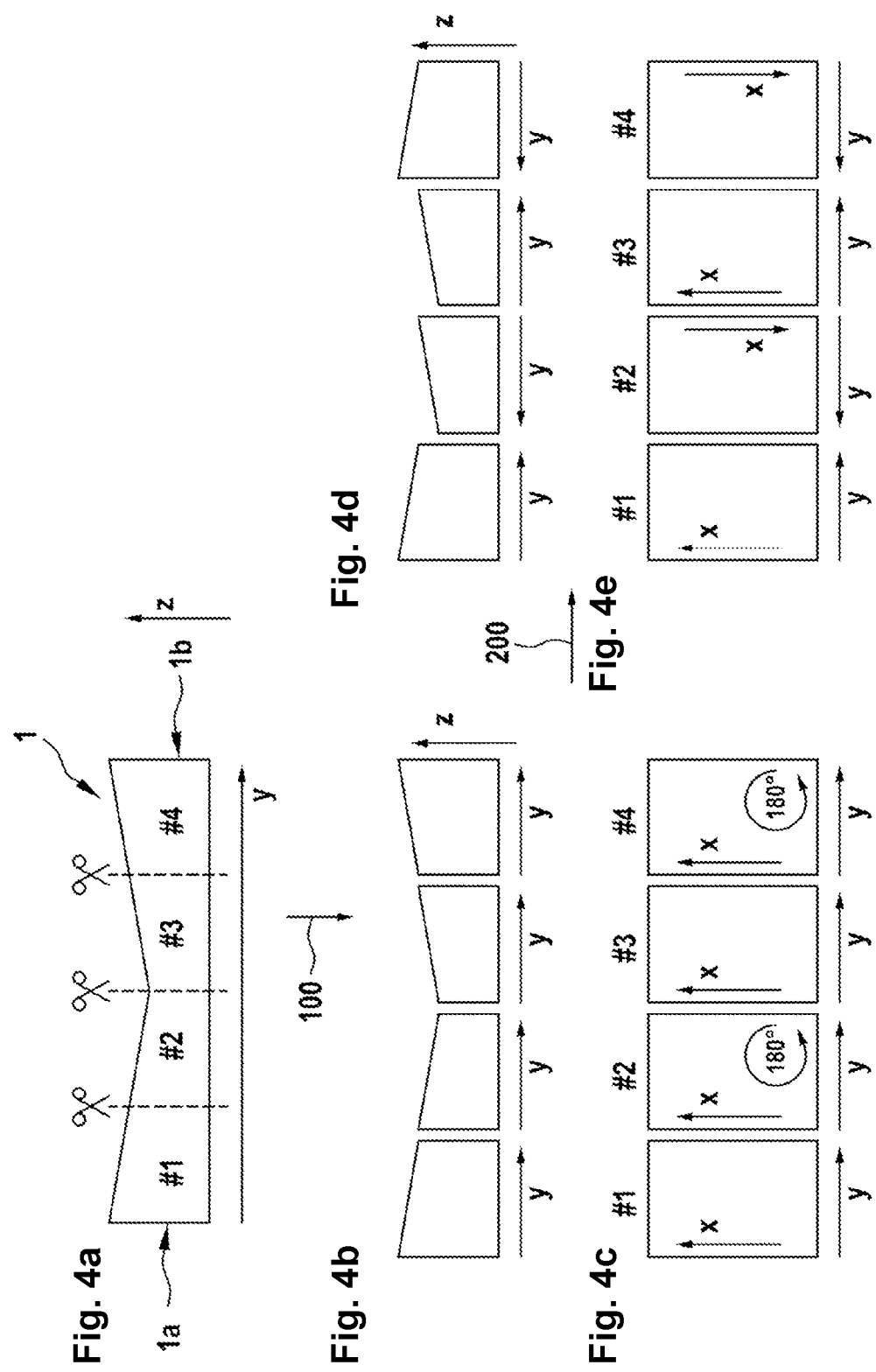
FIGS. 4a-4g show a method of producing a cell stack according to a third example.

As in FIGS. 2 and 3, GDL #2 and GDL #4 are also rotated in method step 200 by 180° in the transverse machine direction, from which the cutting patterns of the GDL #1-#4 result as shown in FIGS. 4d and 4e.

Figure 4G:
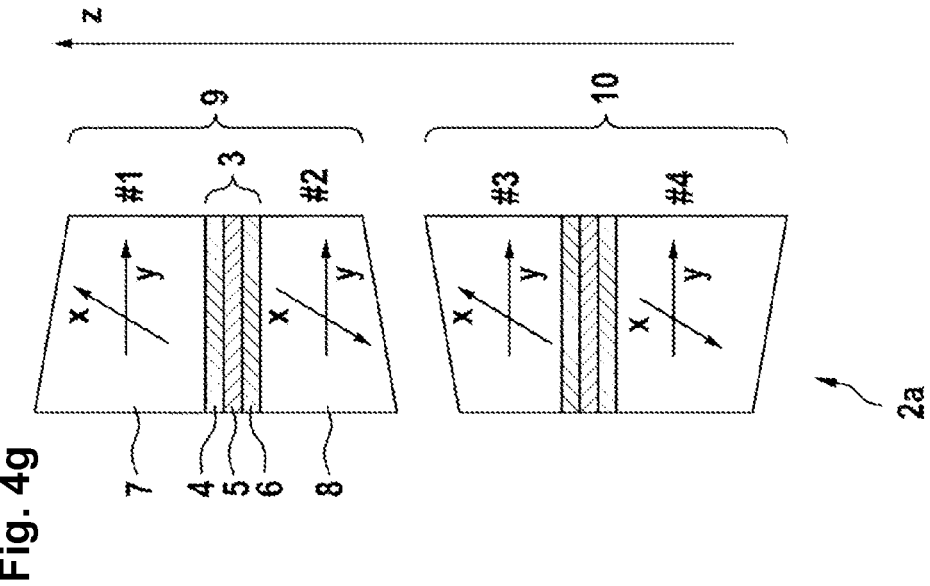
Figure 4F:
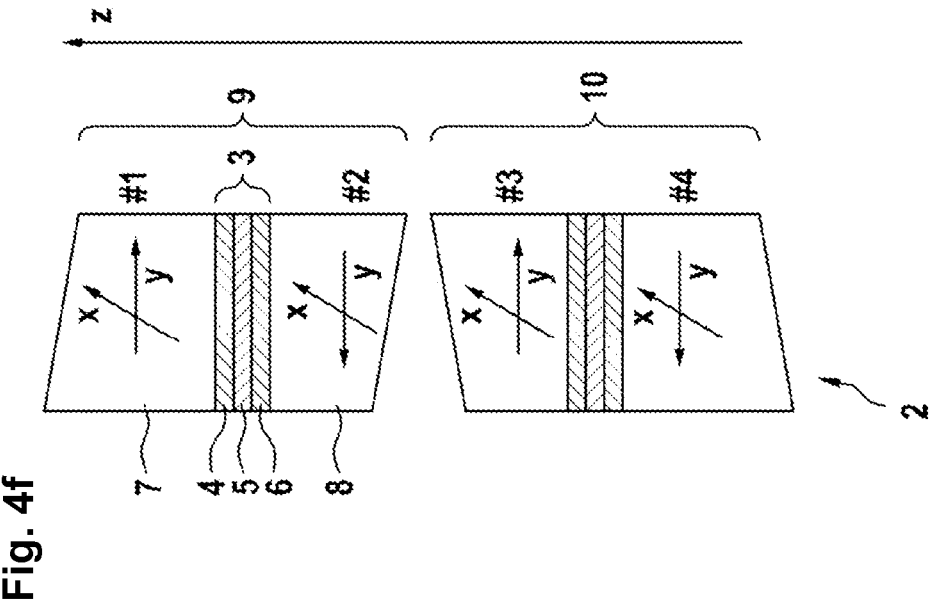

If the GDL #1-#4 are now used in succession for single cells 9, 10 as AGDL 7 and KGDL 8, thus GDL #1 as AGDL 7 of single cell 9, GDL #2 as KGDL 8 of single cell 9, and GDL #3 as AGDL 7 of single cell 10, GDL #4 as KGDL 8 of single cell 10, upon assembly to form single cells 9, 10, the thickness differences or thickness variations existing in the GDL #1-#4 are thus canceled out as shown in FIG. 4f Due to the thickness equalization in the single cells 9, 10, a cell stack 2 consisting of single cells 9, 10 will also overall have an equalized thickness difference.

FIG. 4g shows in contrast that if none of the GDL #1-#4 was rotated by 180°, no thickness equalization takes place in single cells 9 and 10 either. Rather, the first thickness gradient of the AGDL 7 and the second thickness gradient of the KGDL 8 reinforce one another (see cell stack 2a) so that significant pressure inhomogeneities prevail in the layers of the single cells.

FIG. 5 illustrates a method of producing a cell stack according to a fourth example.

In this example, the GDL rolled product 1 has a convex shape in the transverse machine direction y. Along the transverse machine direction, the GDL rolled product 1 thus has two thickness gradients, which extend in opposite directions, from one longitudinal edge 1a to the other longitudinal edge 1b, but in contrast to FIG. 4 from the first GDL #1 to the second GDL #2 with increasing slope in the layer thickness direction z and from the third GDL #3 to the fourth GDL #4 with decreasing slope in the layer thickness direction z. If this GDL rolled product 1 is now singularized into GDL in the form such that per row four GDL #1, #2, #3, and #4 are singularized, their cutting pattern thus results as shown in FIGS. 5b and 5c, wherein FIG. 5b, similarly to FIGS. 2b, 3b, and 4b, again shows a sectional view in transverse machine direction y and FIG. 5c, similarly to FIGS. 2c, 3c, and 4c, shows a top view of the GDL #1-#4 spanned in the longitudinal machine direction x and transverse machine direction y.

Figures 5A, 5B, 5C, 5D, 5E:
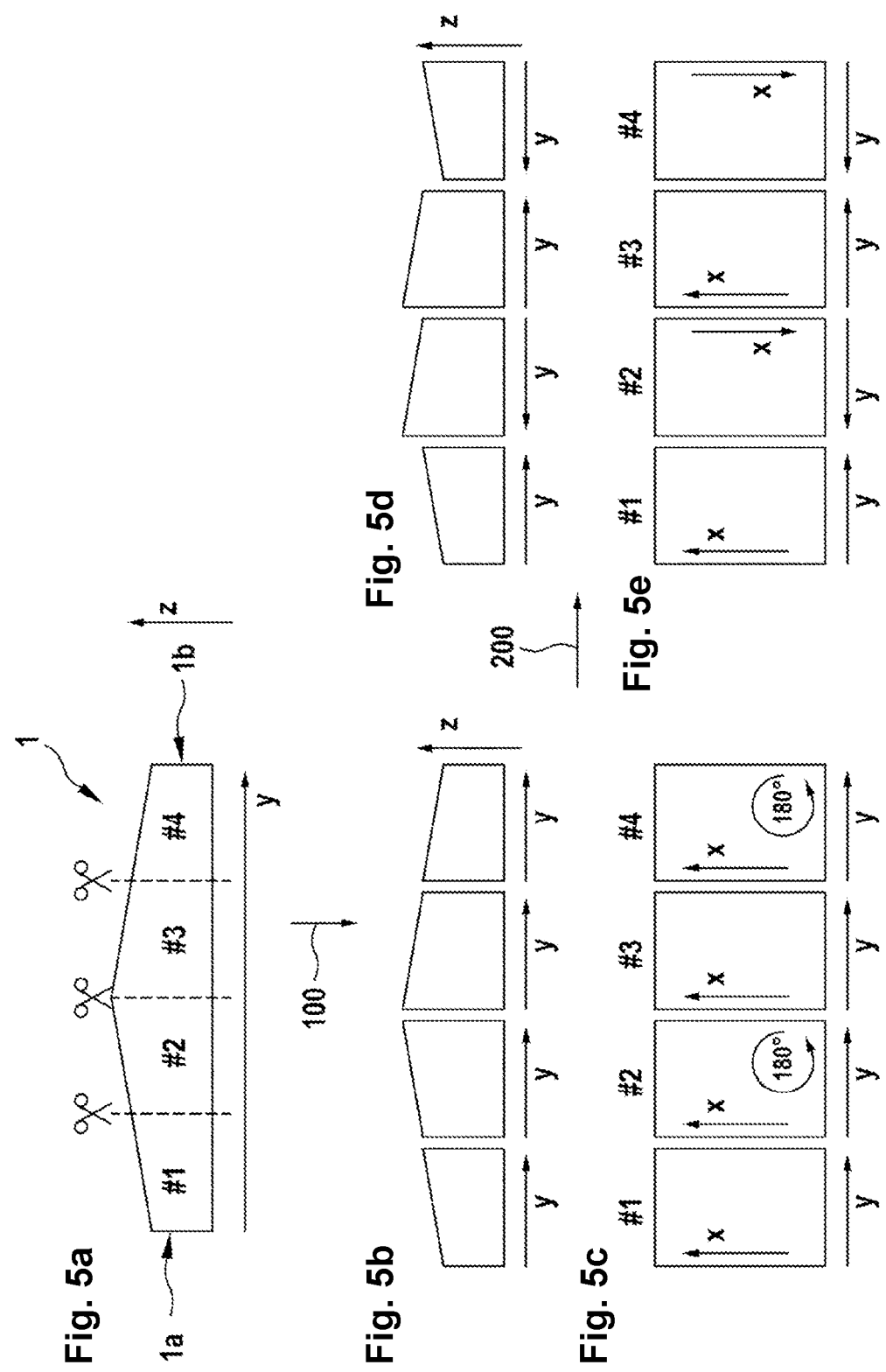
FIGS. 5a-5g show a method of producing a cell stack according to a fourth example.

As in FIGS. 2 and 4, GDL #2 and GDL #4 are also rotated in method step 200 by 180° in the transverse machine direction, from which the cutting patterns of the GDL #1-#4 as shown in FIGS. 5d and 5e result.

Figure 5G:
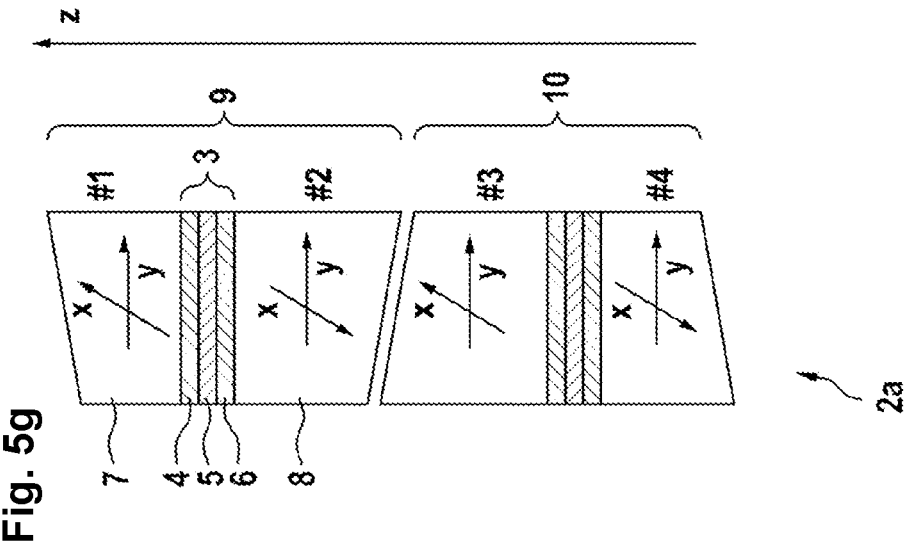
Figure 5F:
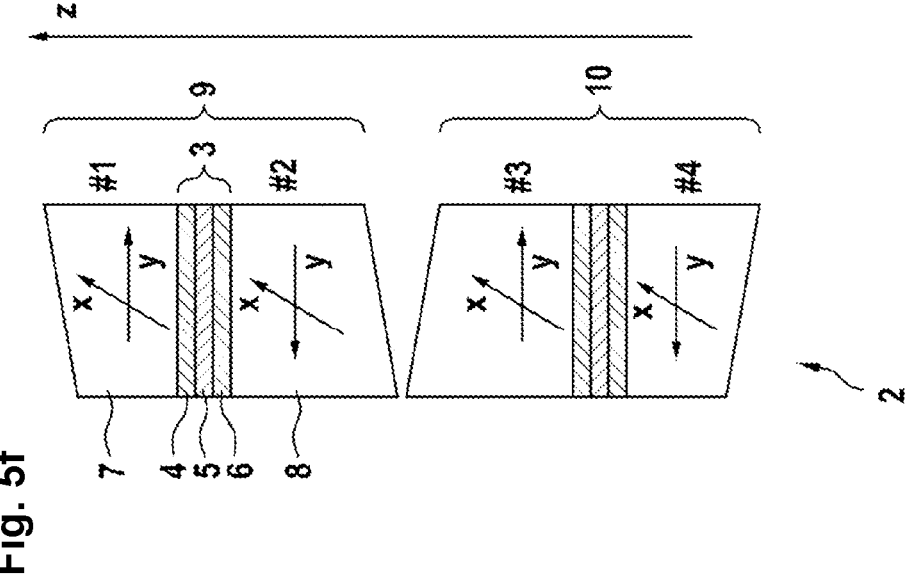

If the GDL #1-#4 are now used in succession for single cells 9, 10 as the AGDL 7 and KGDL 8, thus GDL #1 as AGDL 7 of single cell 9, GDL #2 as KGDL 8 of single cell 9, and GDL #3 as AGDL 7 of single cell 10, GDL #4 as KGDL 8 of single cell 10, upon assembly to form single cells 9, 10, the thickness differences or thickness variations existing in the GDL #1-#4, as shown in FIG. 5f, are thus canceled out. Due to the thickness equalization in the single cells 9, 10, a cell stack 2 consisting of single cells 9 and 10 will also overall have an equalized thickness difference.

FIG. 5g, in contrast, shows that if none of the GDL #1-#4 was rotated by 180° (see cell stack 2a), no thickness equalization also takes place in single cells 9 and 10. Rather, the first thickness gradient of the AGDL 7 and the second thickness gradient of the KGDL 8 reinforce one another so that significant pressure inhomogeneities prevail in the layers of the single cells 9, 10.

FIG. 6 illustrates a method of producing a cell stack according to a fifth example.

In this example, the GDL rolled product 1 has a wavelike shape in the transverse machine direction y. Along the transverse machine direction y, the GDL rolled product 1 thus has three thickness gradients from one longitudinal edge 1a to the other longitudinal edge 1b, wherein the first thickness gradient and the third thickness gradient extend in the same direction and increase and a thickness gradient lying in between extends in a decreasing direction.

The first and the fourth GDL #1, #4 have an increasing slope in the layer thickness direction z and the second and the third GDL #2, #3 each have one increasing and one decreasing slope in the layer thickness direction z. If this GDL rolled product 1 is now singularized to form GDL in the form such that per row four GDL #1, #2, #3, and #4 are singularized, their cutting pattern thus results as shown in FIGS. 6b and 6c, wherein FIG. 6b, similarly to FIGS. 2b, 3b, 4b, and 5b, again shows a sectional view in the transverse machine direction y and FIG. 6c, similarly to FIGS. 2c, 3c, 4c, and 5c, shows a top view of the GDL #1-#4 spanned in the longitudinal machine direction x and transverse machine direction y.

As in the preceding figures, GDL #2 and GDL #4 are also rotated here in method step 200 by 180° in the transverse machine direction, from which the cutting patterns of the GDL #1-#4 as shown in FIGS. 6d and 6e result.

Figure 6G:
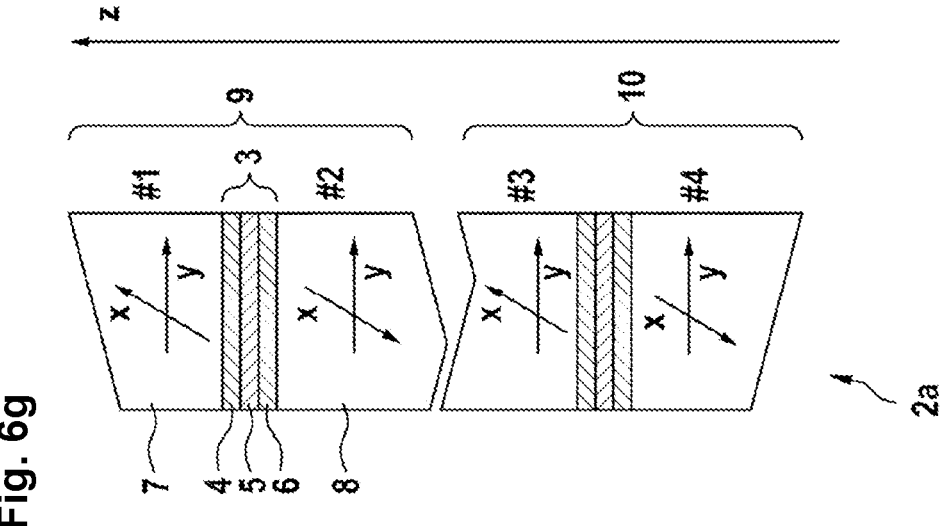
Figure 6F:
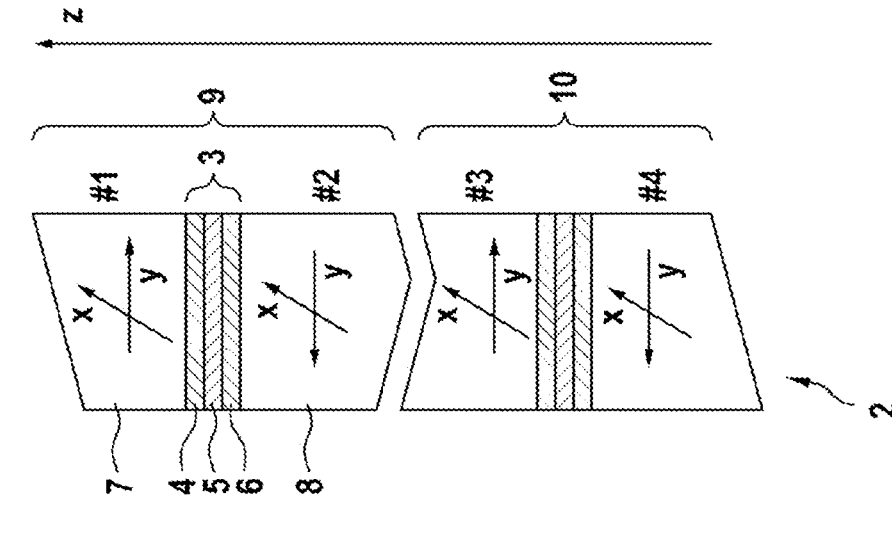

If the GDL #1-#4 are now used in succession for single cells 9, 10 as AGDL 7 and KGDL 8, which are assembled to form cell stack 2, thus GDL #1 as AGDL 7 of single cell 9, GDL #2 as KGDL 8 of single cell 9, and GDL #3 as AGDL 7 of single cell 10, GDL #4 as KGDL 8 of single cell 10, upon assembly of the single cells 9, 10 to form cell stack 2, the thickness differences or thickness variations existing in the GDL #1-#4, as shown in FIG. 6f, are canceled out, wherein a complete equalization of the thickness differences between AGDL 7 and KGDL 8 does not result within the single cells 9, 10, however.

FIG. 6g, in contrast, shows that if none of the GDL #1-#4 were rotated by 180°, no thickness equalization takes place in the cell stack 2a assembled from single cells 9, 10. Rather, the first thickness gradient of the AGDL 7 and the second thickness gradient of the KGDL 8 reinforce one another so that significant pressure inhomogeneities prevail in the layers of the single cells 9, 10.

FIG. 7 illustrates a method of producing a cell stack according to a sixth example.

In this example, the GDL rolled product 1 has a thickness gradient increasing from the first longitudinal edge 1a to the second longitudinal edge 1b in the transverse machine direction y, specifically so that an increasing slope in the transverse machine direction y can be seen over the first and the second GDL #1 and #2, while the third and fourth GDL #3, #4 have a constant layer thickness without thickness gradient.

Figures 7A, 7B, 7C, 7D, 7E:
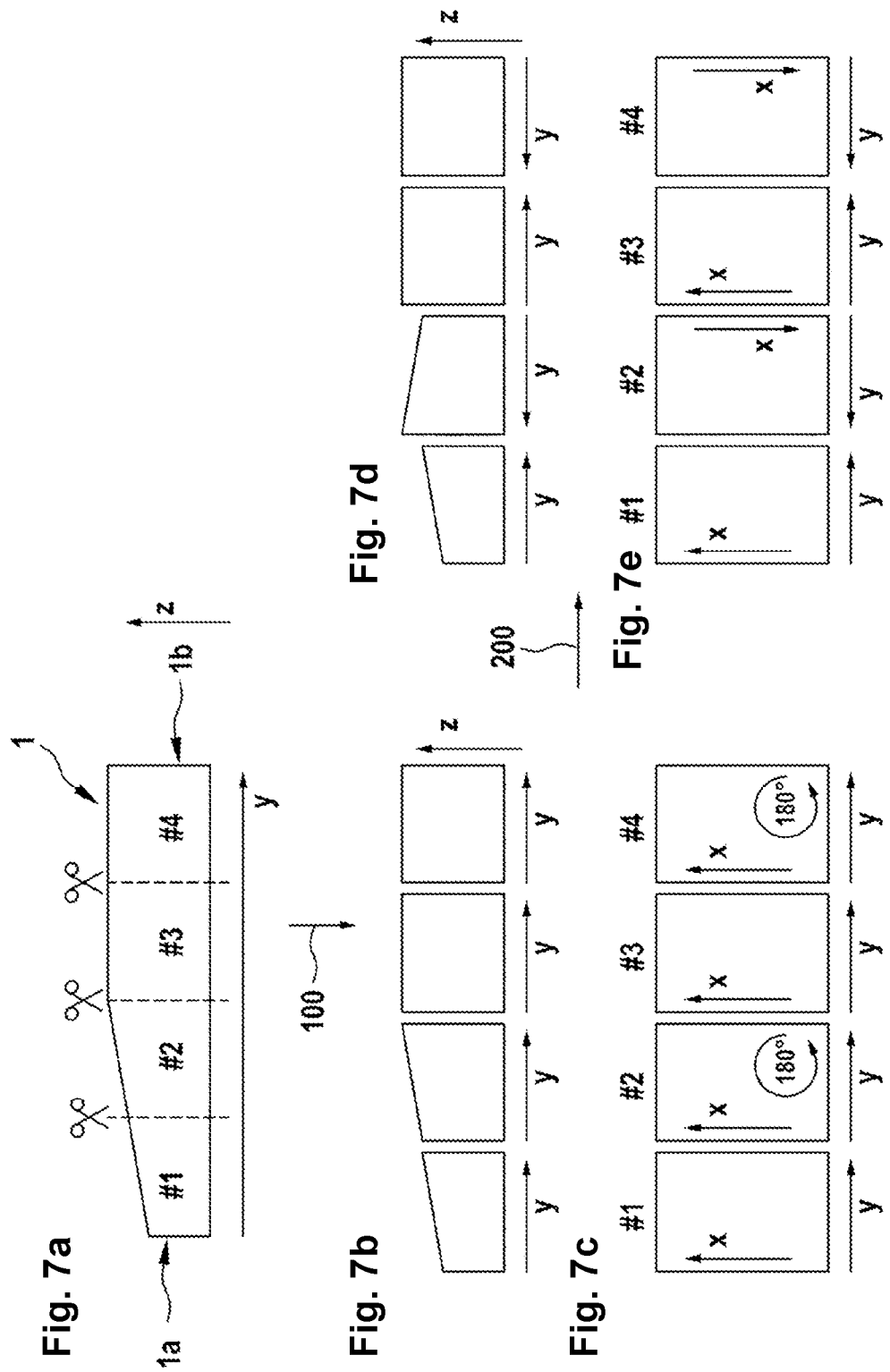
FIGS. 7a-7g show a method of producing a cell stack according to a sixth example.

If this GDL rolled product 1 is now singularized into GDL in the form such that per row four GDL #1, #2, #3, and #4 are singularized, their cutting pattern thus results as shown in FIGS. 7b and 7c, wherein FIG. 7b, similarly to FIGS. 2b, 3b, 4b, 5b, and 6b, again shows a sectional view in the transverse machine direction y and FIG. 7c, similarly to FIGS. 2c, 3c, 4c, 5c, and 6c, shows a top view of the GDL #1-#4 spanned in the longitudinal machine direction x and transverse machine direction y.

As in the preceding figures, GDL #2 and GDL #4 are also rotated here in method step 200 by 180° in the transverse machine direction y, from which the cutting patterns of the GDL #1-#4 as shown in FIGS. 7d and 7e result.

Figure 7G:
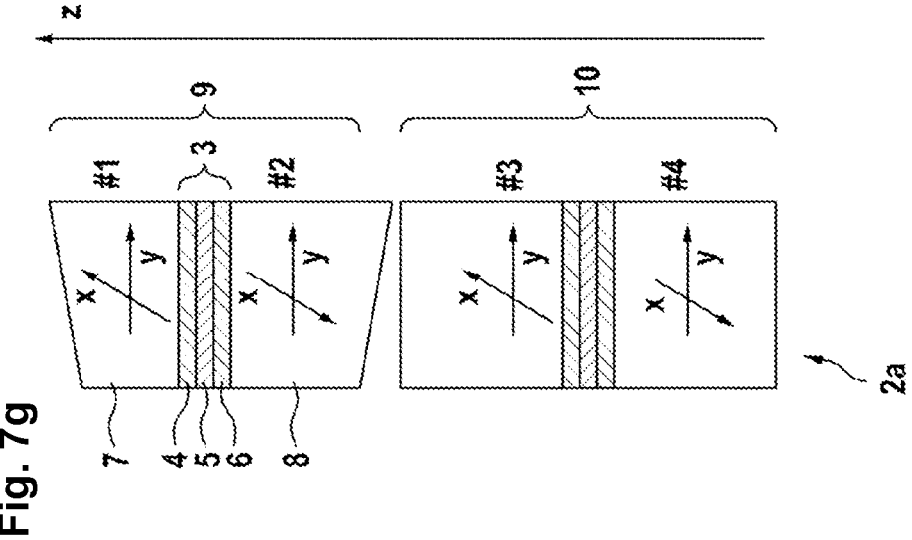
Figure 7F:
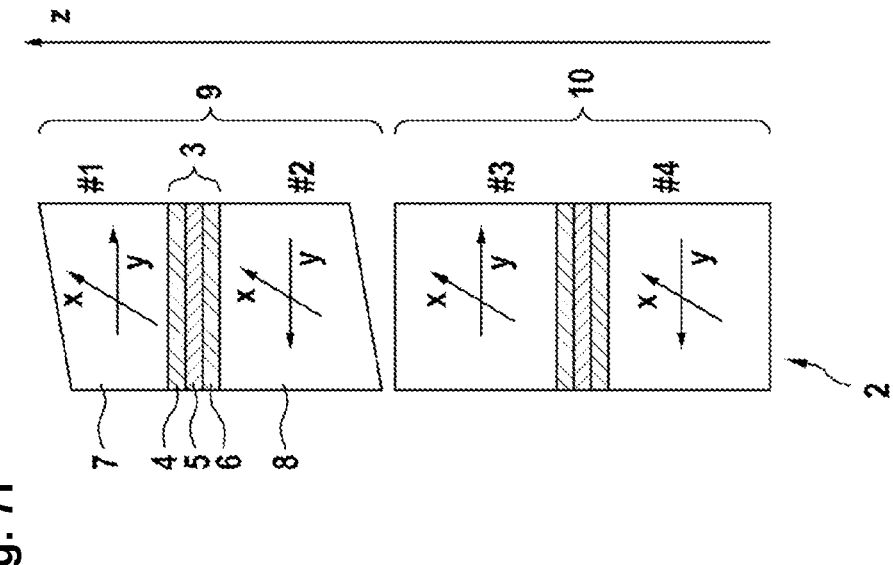

If the GDL #1-#4 are now used in succession for single cells 9, 10 as the AGDL 7 and KGDL 8, which are assembled to form cell stack 2, thus GDL #1 as AGDL 7 of single cell 9, GDL #2 as KGDL 8 of single cell 9, and GDL #3 as AGDL 7 of single cell 10, GDL #4 as KGDL 8 of single cell 10, upon assembly into single cells 9, 10, thickness differences or thickness variations existing in the GDL #1-#4, as shown in FIG. 7f, are canceled out in the single cells 9, 10, and a complete equalization of the thickness differences between the respective AGDL 7 and respective KGDL 8 results within the cell stack 2. The single cell 10 has, due to the uniform thickness of the GDL #3 and #4, an overall homogeneous thickness distribution and thus also contributes to the homogeneity of the cell stack.

FIG. 7g, in contrast, shows that if none of the GDL #1-#4 were rotated by 180°, no thickness equalization takes place in the single cell 9. Rather, the first thickness gradient of the AGDL 7 and the second thickness gradient of the KGDL 8 reinforce one another so that significant pressure inhomogeneities prevail in the layer of the single cells 9. The single cell 10 has, due to the uniform thickness of the GDL #3 and #4, an overall homogeneous thickness distribution and thus also does not contribute to the inhomogeneity of the cell stack.

FIG. 8 illustrates a method of producing a cell stack according to a seventh example.

In this example, the GDL rolled product 1 has a thickness gradient decreasing in the transverse machine direction y from the first longitudinal edge 1a to the second longitudinal edge 1b, specifically so that a decreasing slope can be seen over the first and the second GDL #1 and #2, while the third and the fourth GDL #3, #4 have a constant layer thickness without thickness gradient having lesser layer thickness.

Figures 8A, 8B, 8C, 8D, 8E:
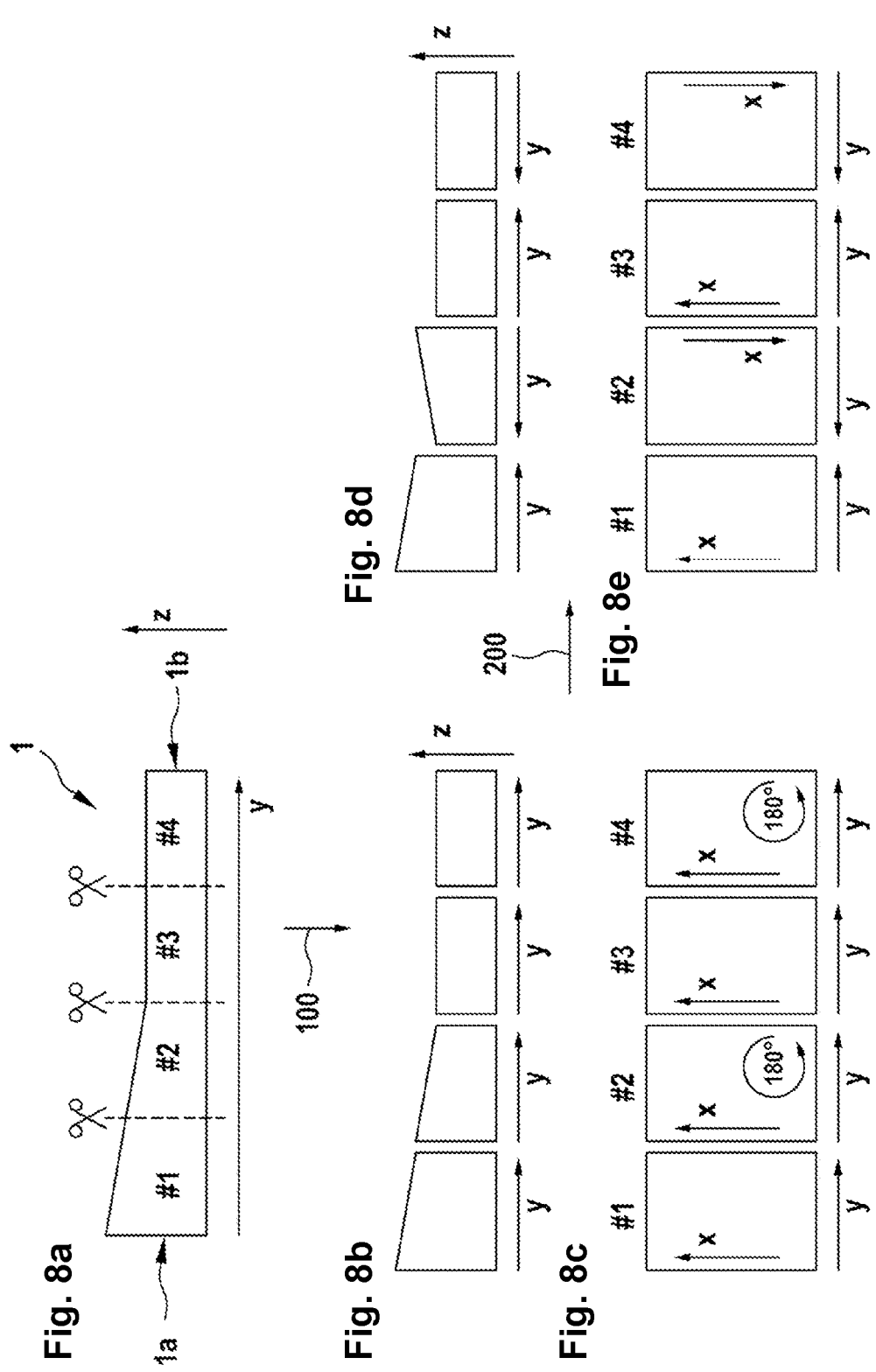
FIGS. 8a-8g show a method of producing a cell stack according to a seventh example.

If this GDL rolled product 1 is now singularized into GDL in the form such that per row four GDL #1, #2, #3, and #4 are singularized, their cutting pattern thus results as shown in FIGS. 8b and 8c, wherein FIG. 8b, similarly to FIGS. 2b, 3b, 4b, 5b, 6b, and 7b, again shows a sectional view in the transverse machine direction y and FIG. 8c, similarly to FIGS. 2c, 3c, 4c, 5c, 6c, and 7c, shows a top view of the GDL #1-#4 spanned in the longitudinal machine direction x and transverse machine direction y.

As in the preceding figures, GDL #2 and GDL #4 are also rotated here in method step 200 by 180° in the transverse machine direction, from which the cutting patterns of the GDL #1-#4 as shown in FIGS. 8d and 8e result.

Figure 8G:
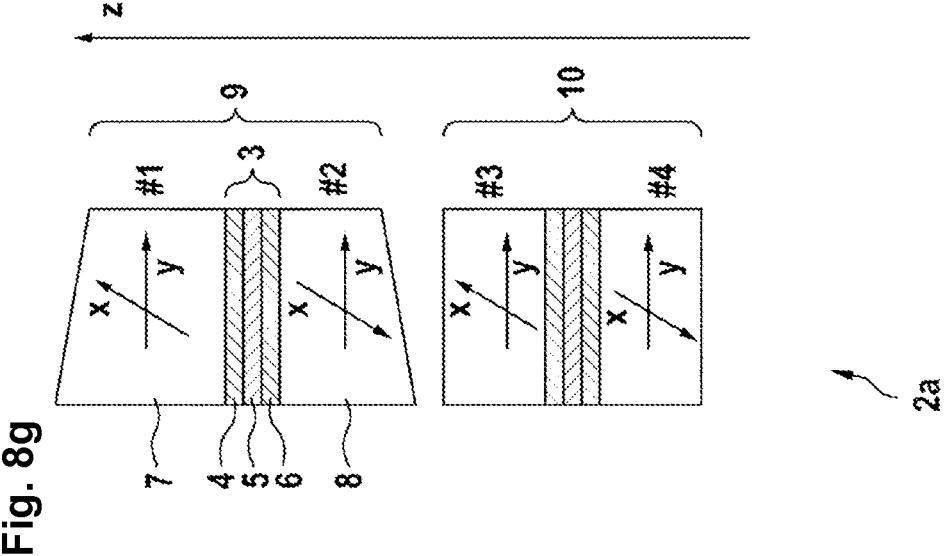
Figure 8F:
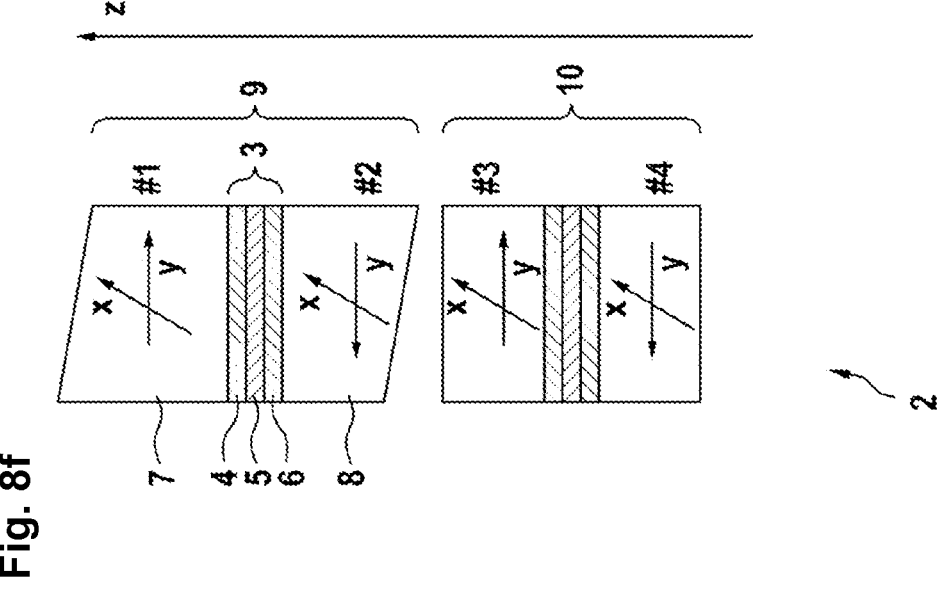

If the GDL #1-#4 are now used in succession for single cells 9, 10 as AGDL 7 and KGDL 8, which are assembled into cell stack 2, thus GDL #1 as AGDL 7 of single cell 9, GDL #2 as KGDL 8 of single cell 9, and GDL #3 as AGDL 7 of single cell 10, GDL #4 as KGDL 8 of single cell 10, upon assembly into single cells 9, 10, thickness differences or thickness variations existing in the GDL #1-#4, as shown in FIG. 8f, are canceled out in the single cells 9, 10, and within the cell stack 2, a complete equalization of the thickness differences results between the respective AGDL 7 and respective KGDL 8. The single cell 10 has an overall homogeneous thickness distribution due to the uniform thickness of the GDL #3 and #4, and thus also contributes to the homogeneity of the cell stack.

FIG. 8g shows that if none of the GDL #1-#4 were rotated by 180°, no thickness equalization takes place in the single cells 9. Rather, the first thickness gradient of the AGDL 7 and the second thickness gradient of the KGDL 8 reinforce one another so that significant pressure inhomogeneities prevail in the layers of the single cell 9. The single cell 10 has an overall homogeneous thickness distribution due to the uniform thickness of the GDL #3 and #4 and thus also does not contribute to the inhomogeneity of the cell stack 2a.

FIG. 9 illustrates a method of producing a cell stack according to an eighth example.

This example is similar to that from FIG. 2, with the difference that the GDL singularized to form GDL #1-#4 are used by way of example only for the anode side, thus exclusively as AGDL 7. Therefore GDL #1 is used as AGDL 7 in the first single cell 9, GDL #2 as AGDL 7 in the second single cell 10, GDL #3 as AGDL 7 in the third single cell 11, and GDL #4 as AGDL 7 in the fourth single cell 12.

Figure 9G:
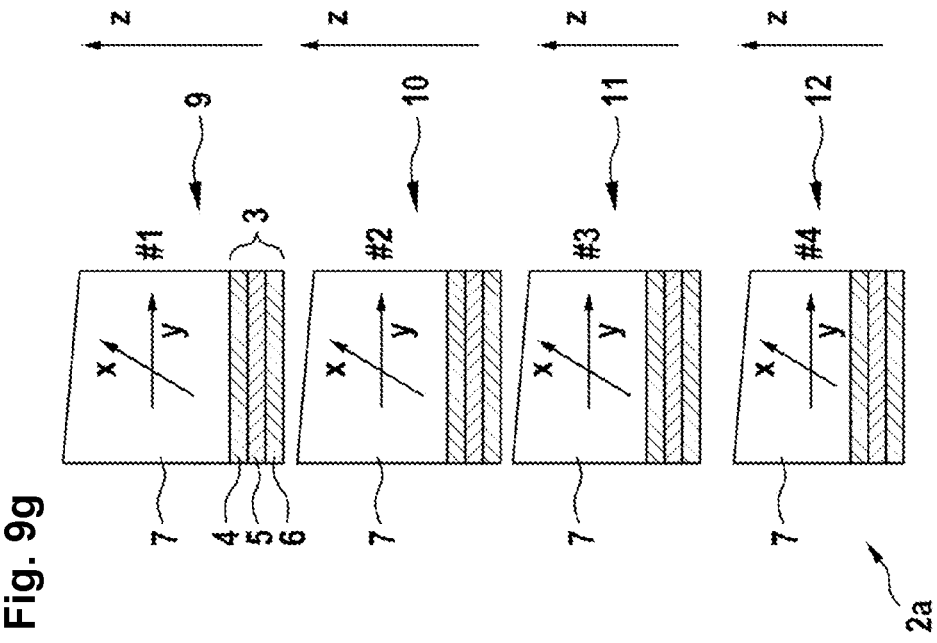
Figure 9F:
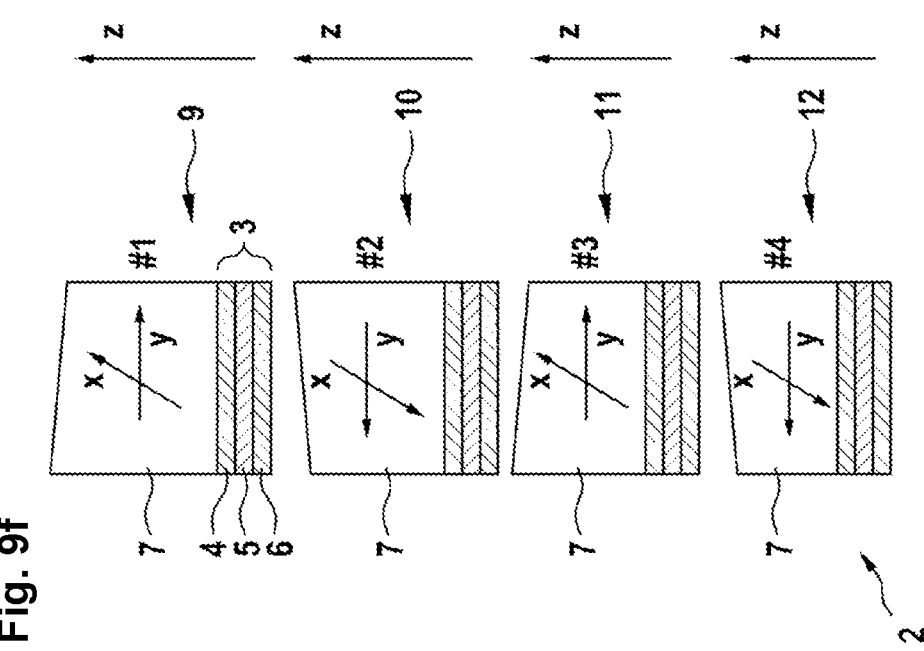

Due to the rotation of the second and the fourth GDL #2, #4 in the transverse machine direction y, after assembly of the cell stack 2 (for simplification the KGDL 8 are omitted), as shown in FIG. 9f, an equalization of the thickness difference or the thickness variation is achieved over the entire cell stack 2 on the anode side by the corresponding alignment of the AGDL 7. The overall thickness gradient is thus reduced or even equalized. The AGDL 7 are thus arranged in the cell stack 2 such that their thickness gradients cancel out, by which a very homogeneous pressure distribution can be achieved over all layers of the cell stack 2, and the cell stack 2 is distinguished by a permanently high power density.

In contrast thereto, a homogeneous pressure distribution over all layers does not result in the cell stack 2a (see FIG. 9g). The second and the fourth GDL #2, #4 were not rotated in the transverse machine direction y here.

FIG. 10 illustrates a method of producing a cell stack according to a ninth example.

This example is similar to that from FIG. 4 (concave configuration of the GDL rolled product 1 in the layer thickness direction z), with the difference that the GDL singularized to form GDL #1-#4 are again used by way of example only for the anode side, thus exclusively as the AGDL 7. Therefore GDL #1 is used as the AGDL 7 in the first single cell 9, in the second single cell 10, in the third single cell 11, and in the fourth single cell 12.

Figure 10F:
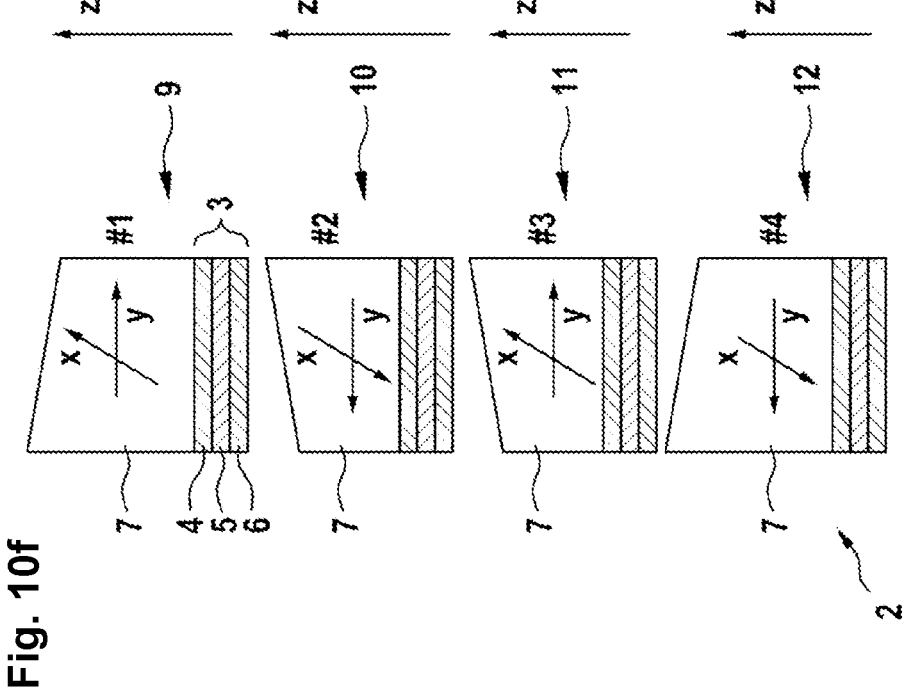

Due to the rotation of the second and the fourth GDL #2, #4 in the transverse machine direction y, after assembly of the cell stack 2 (for simplification the KGDL 8 are again omitted), as shown in FIG. 10f, a significant reduction of the thickness difference or the thickness variation is achieved over the entire cell stack 2 on the anode side by the corresponding alignment of the AGDL 7. The AGDL 7 are thus arranged in the cell stack 2 such that their thickness gradients decrease in total, thus thickness variations are reduced, by which a very homogeneous pressure distribution can be achieved over all layers of the cell stack 2, and the cell stack 2 is distinguished by a permanently high power density.

Figures 11A, 11B, 11C, 11D, 11E:
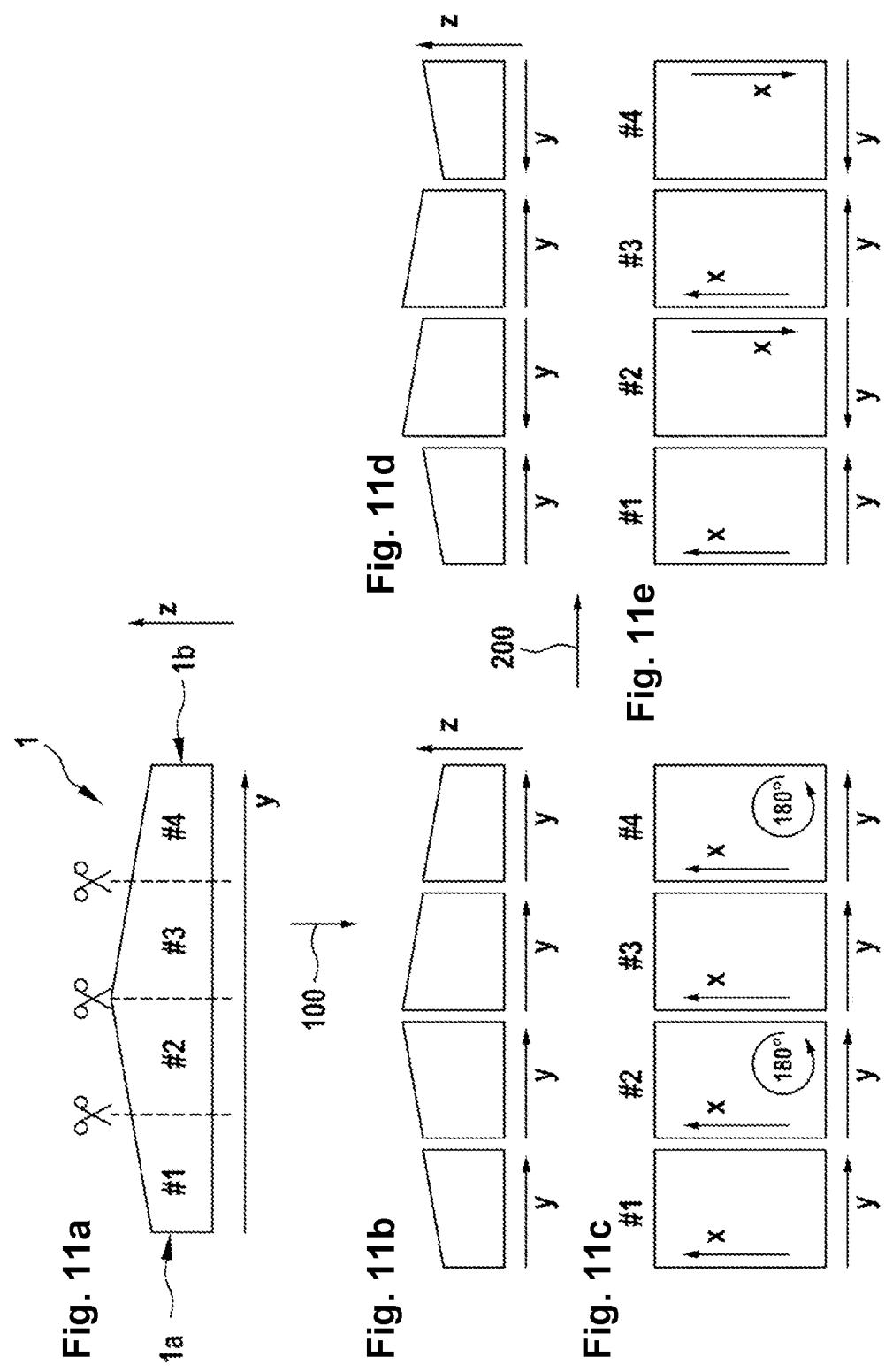
FIGS. 11a-11f show a method of producing a cell stack according to a tenth example.

FIG. 11 illustrates a method of producing a cell stack according to a tenth example.

This example is similar to that from FIG. 5 (convex configuration of the GDL rolled product 1 in the layer thickness direction z), with the difference that the GDL singularized to form GDL #1-#4 are again used by way of example only for the anode side, thus exclusively as the AGDL 7. Therefore, GDL #1 is used as the AGDL 7 in the first single cell 9, in the second single cell 10, in the third single cell 11, and in the fourth single cell 12.

Figure 11F:
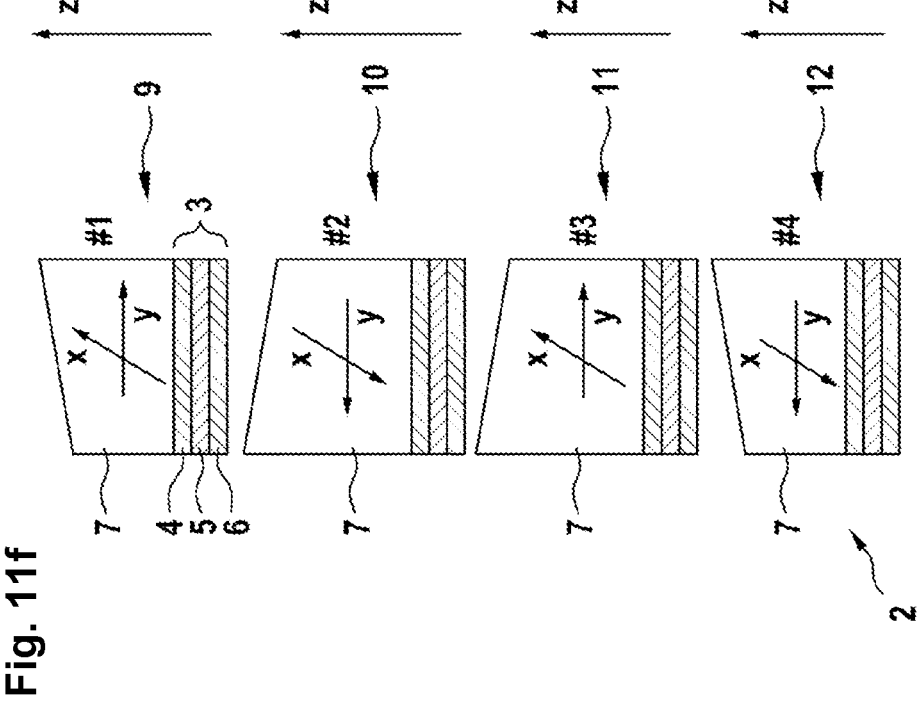

Due to the rotation of the second and the fourth GDL #2, #4 in the transverse machine direction y, after assembly of the cell stack 2 (the KGDL 8 are again omitted for simplification), as shown in FIG. 11*f*, a reduction of the thickness difference or the thickness variation is achieved over the entire cell stack 2 on the anode side by the corresponding alignment of the AGDL 7. The AGDL 7 are thus arranged in the cell stack 2 such that their thickness variation is reduced, whereby a very homogeneous pressure distribution can be achieved over all layers of the cell stack 2, and the cell stack 2 is distinguished by a permanently high power density.

Figure 12F:
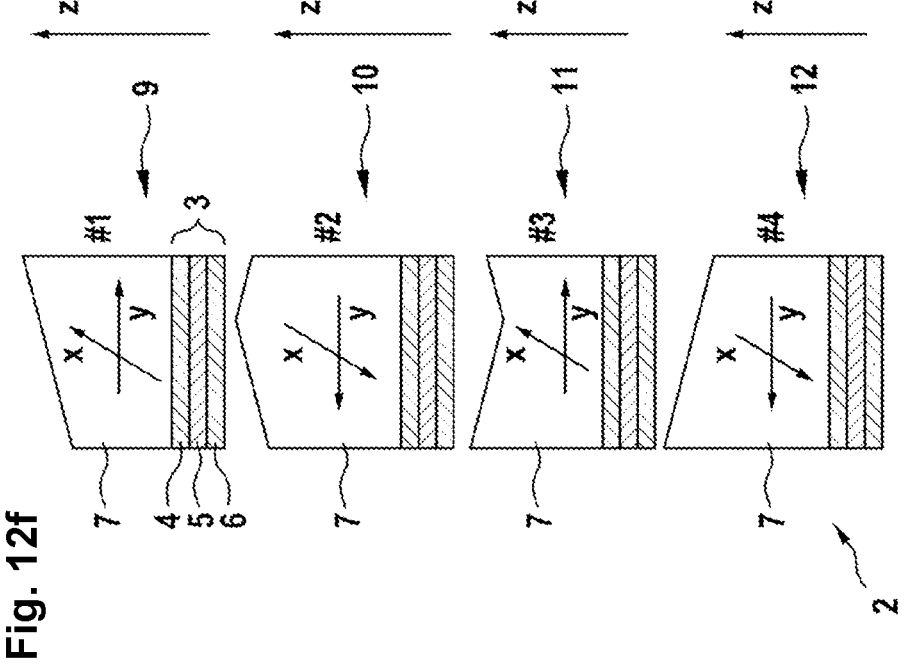

FIG. 12 illustrates a method of producing a cell stack according to an eleventh example.

This example is similar to that from FIG. 6 (wave shape), with the difference that the GDL singularized to form GDL #1-#4 are used by way of example only for the anode side, thus exclusively as the AGDL 7. Therefore, GDL #1 is used as the AGDL 7 in the first single cell 9, in the second single cell 10, in the third single cell 11, and in the fourth single cell 12.

Due to the rotation of the second and the fourth GDL #2, #4 in the transverse machine direction y, after assembly of the cell stack 2 (the KGDL 8 are omitted for simplification), as shown in FIG. 9*f*, an equalization of the thickness difference or the thickness variation is achieved over the entire cell stack 2 on the anode side by the corresponding alignment of the AGDL 7. The AGDL 7 are thus arranged in the cell stack 2 such that their thickness gradients cancel out, by which a very homogeneous pressure distribution can be achieved over all layers of the cell stack 2, and the cell stack 2 is distinguished by a permanently high power density.

Figures 13A, 13B, 13C, 13D, 13E:
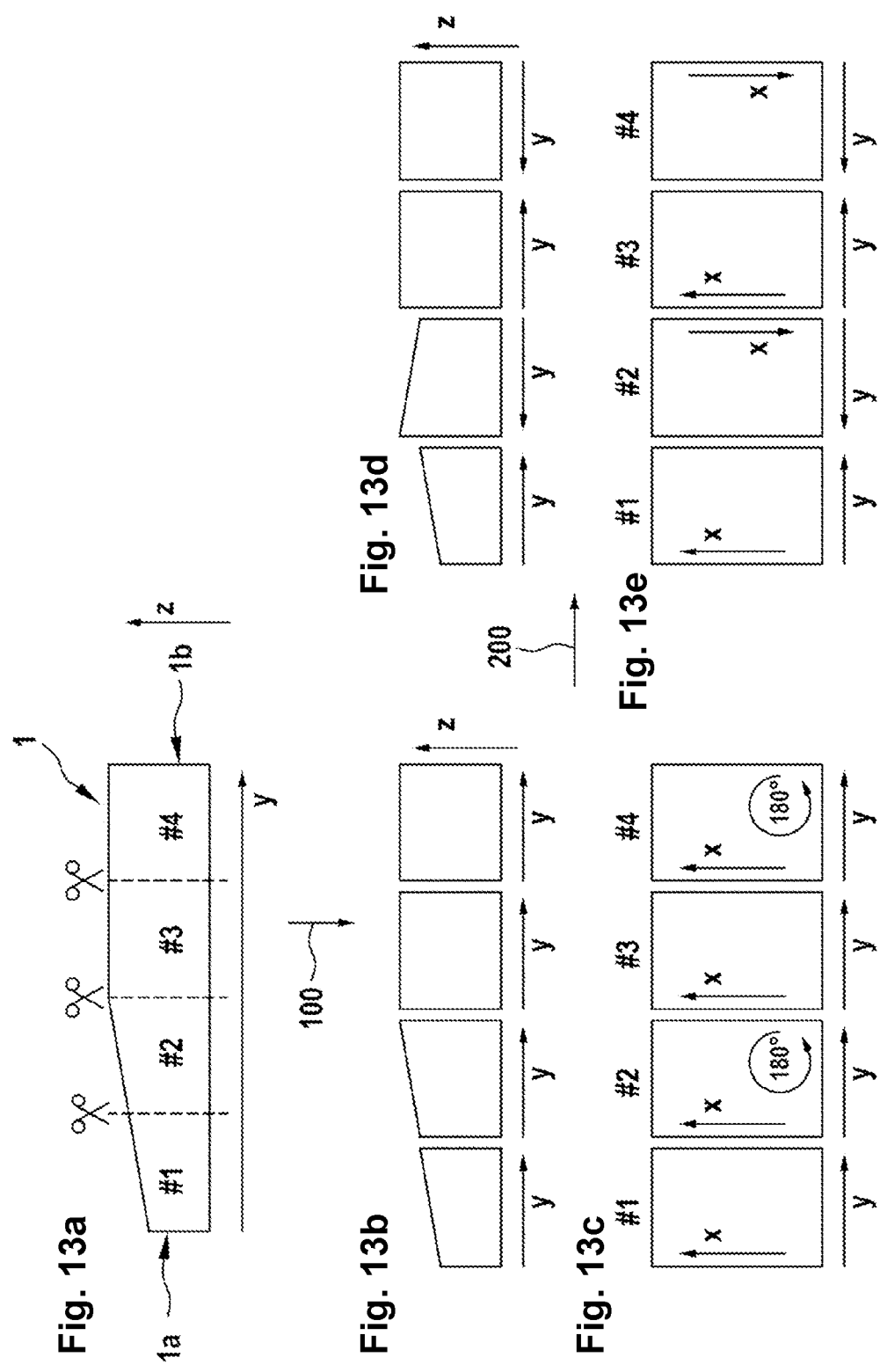
FIGS. 13a-13f show a method of producing a cell stack according to a twelfth example.

FIG. 13 illustrates a method of producing a cell stack according to a twelfth example.

This example is similar to that from FIG. 7 (increasing layer thickness in the first and second GDL #1, #2 and constant layer thickness in the third and fourth GDL #3, #4), with the difference that the GDL singularized to form GDL #1-#4 are again only used by way of example for the anode side, thus exclusively as the AGDL 7. Therefore, GDL #1 is used as the AGDL 7 in the first single cell 9, in the second single cell 10, in the third single cell 11, and in the fourth single cell 12.

Figure 13F:
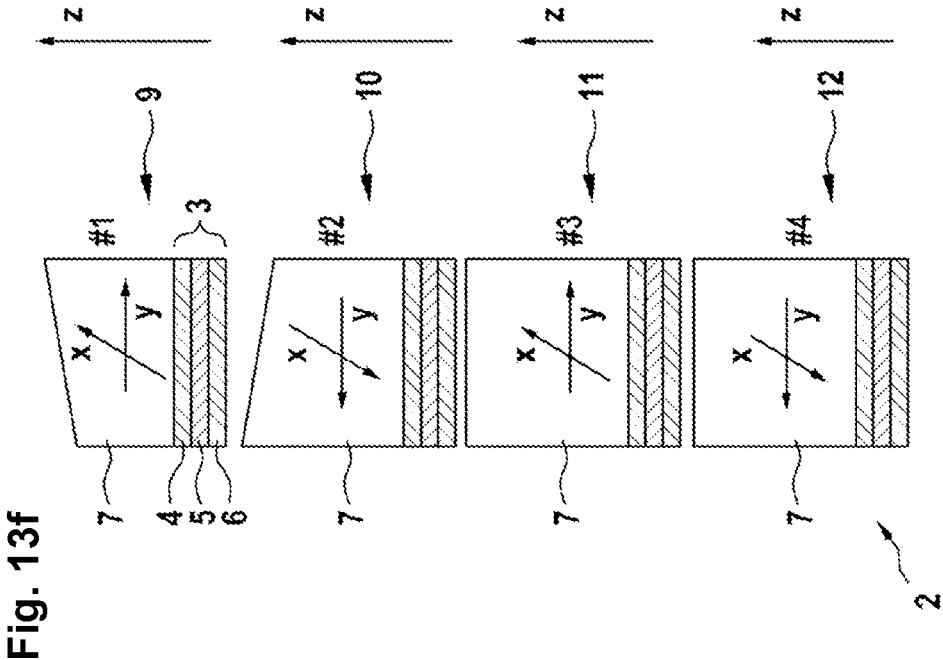

Due to the rotation of the second and the fourth GDL #2, #4 in the transverse machine direction y, after assembly of the cell stack 2 (the KGDL 8 are again omitted for simplification), as shown in FIG. 13*f*, a reduction of the thickness difference or the thickness variation is achieved over the entire cell stack 2 on the anode side by the corresponding alignment of the AGDL 7. The AGDL 7 are thus arranged in the cell stack 2 such that their thickness variation is reduced, by which a very homogeneous pressure distribution can be achieved over all layers of the cell stack 2, and the cell stack 2 is distinguished by a permanently high power density.

Figures 14A, 14B, 14C, 14D, 14E:
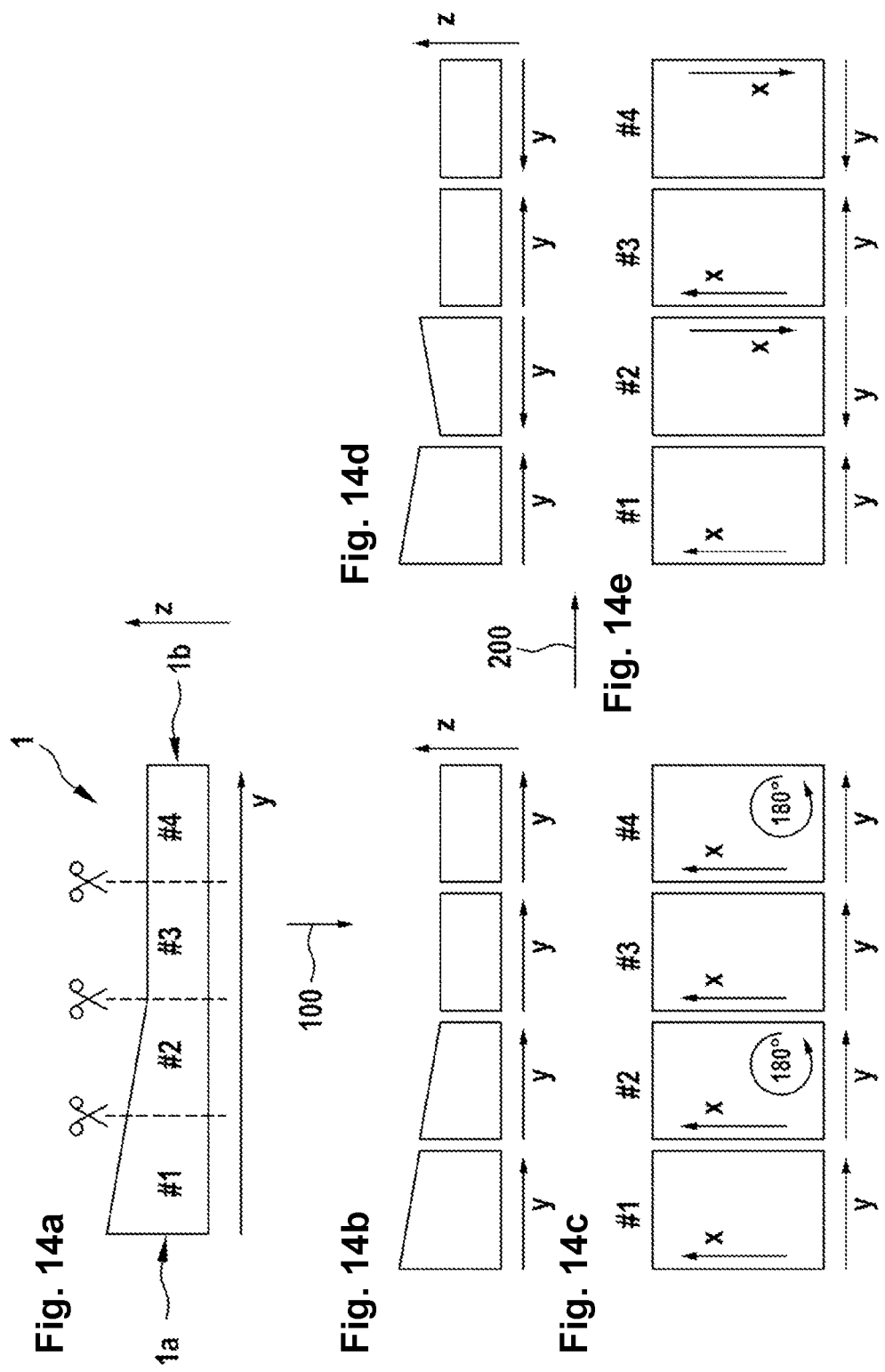
FIGS. 14a-14f show a method of producing a cell stack according to a thirteenth example.

FIG. 14 illustrates a method of producing a cell stack according to a thirteenth example.

This example is similar to that from FIG. 8 (decreasing layer thickness in the first and second GDL #1, #2 and constant layer thickness in the third and fourth GDL #3, #4), with the difference that the GDL singularized to form GDL #1-#4 are again only used by way of example for the anode side, thus exclusively as AGDL 7. Therefore, GDL #1 is used as AGDL 7 in the first single cell 9, in the second single cell 10, in the third single cell 11, and in the fourth single cell 12.

Figure 14F:
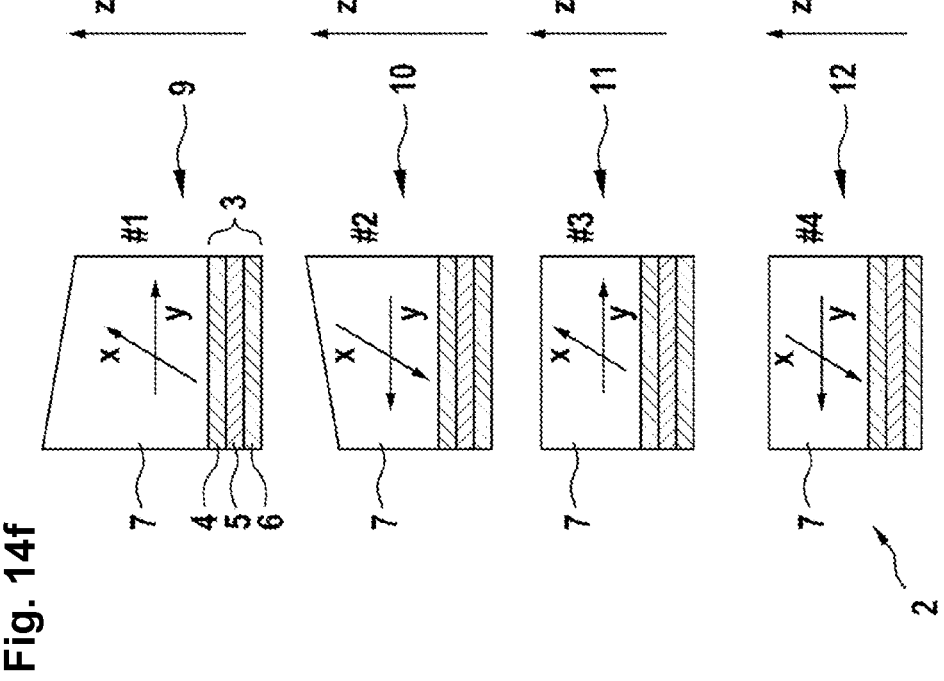

Due to the rotation of the second and the fourth GDL #2, #4 in the transverse machine direction y, after assembly of the cell stack 2 (the KGDL 8 are again omitted for simplification), as shown in FIG. 14*f*, a reduction of the thickness difference or the thickness variation is achieved over the entire cell stack 2 on the anode side by the corresponding alignment of the AGDL 7. The AGDL 7 are thus arranged in the cell stack 2 such that their thickness variation is reduced, by which a very homogeneous pressure distribution can be achieved over all layers of the cell stack 2, and the cell stack 2 is distinguished by a permanently high power density.

Figure 15:
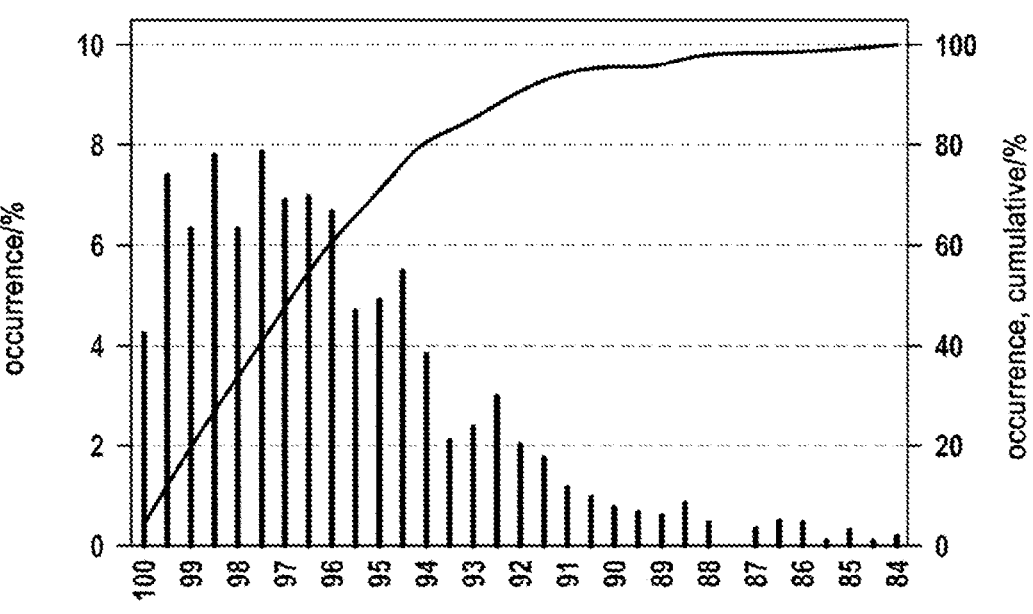
FIG. 15 shows a simulation of a result of a statistical rotation for GDL having a linear gradient over 500 cell stacks each having 400 GDL.

FIG. 15 illustrates the result of a statistical rotation of GDLs according to a fourteenth example. As the foundation of the simulation, 400 GDLs having linear thickness gradients were used here. The simulation was repeated for 500 cell stacks. In 96.2% (481) of the configurations, therefore less than or equal to 20 GDL pairs, in other words 40 GDL, in other words less than or equal to 10% of the total number of GDL resulted, the thickness gradient of which was not equalized. The statistical rotation or nonrotation of GDL thus resulted in over 95% of the configurations in a reduction of the overall thickness inhomogeneity of the cell stack by more than 90%.

In addition to the above written description, reference is hereby explicitly made to the illustrations in the drawings in FIGS. 1 to 15 for its supplementary disclosure.

The invention claimed is:

1. A cell stack comprising a plurality of single cells, wherein each single cell comprises a membrane electrode assembly having a cathode, an anode, and an interposed membrane, as well as either an anode gas diffusion layer arranged on an exposed side of the anode having a first thickness gradient in a transverse machine direction or a sintered titanium component, and a cathode gas diffusion layer arranged on an exposed side of the cathode having a second thickness gradient in the transverse machine direction, wherein a) in a single cell, the anode gas diffusion layer and the cathode gas diffusion layer are arranged in relation to one another such that a first thickness gradient of the anode gas diffusion layer and a second thickness gradient of the cathode gas diffusion layer run opposite to one another or b) in two or more single cells, anode gas diffusion layers in these two or more cells are arranged in relation to one another such that an overall thickness gradient of the anode gas diffusion layers is minimized and/or wherein in two or more single cells, cathode gas diffusion layers in these two or more cells are arranged in relation to one another such that an overall thickness gradient of the cathode gas diffusion layers is minimized.

2. The cell stack as claimed in claim 1, wherein in all single cells, the anode gas diffusion layers and the cathode gas diffusion layers are each arranged in relation to one another such that the first thickness gradient of the anode gas diffusion layer and the second thickness gradient of the cathode gas diffusion layer run opposite to one another per single cell.

3. The cell stack as claimed in claim 1, wherein the first thickness gradient of the anode gas diffusion layer and the second thickness gradient of the cathode gas diffusion layer are linear.

4. The cell stack as claimed in claim 1, wherein the anode gas diffusion layer and the cathode gas diffusion layer each comprise a microporous layer and a macroporous carrier material, and the microporous layer of the anode gas diffusion layer is oriented to the anode and the microporous layer of the cathode gas diffusion layer is oriented to the cathode.

5. The cell stack as claimed in claim 4, wherein the anode gas diffusion layer and/or the cathode gas diffusion layer of a single cell have a layer thickness of 100 μm to 300 μm and/or the carrier material is selected from a fleece material and a paper material and/or the membrane electrode assembly is circumferentially framed by an edging material.

6. A fuel cell or electrolysis cell comprising a cell stack as claimed in claim 1.

7. A method of producing a cell stack comprising a plurality of single cells, wherein each single cell comprises a membrane electrode assembly having a cathode, an anode, and an interposed membrane, as well as either an anode gas diffusion layer arranged on an exposed side of the anode having a first thickness gradient in a transverse machine direction or a sintered titanium component, and a cathode gas diffusion layer arranged on an exposed side of the cathode having a second thickness gradient in the transverse machine direction, wherein a) in a single cell, the anode gas diffusion layer and the cathode gas diffusion layer are arranged in relation to one another such that the first thickness gradient of the anode gas diffusion layer and the second thickness gradient of the cathode gas diffusion layer run opposite to one another or b) in two or more single cells, anode gas diffusion layers of the two or more cells are arranged in relation to one another such that an overall thickness gradient of these anode gas diffusion layers is minimized and/or wherein in two or more single cells cathode gas diffusion layers of the two or more cells are arranged in relation to one another such that an overall thickness gradient of these cathode gas diffusion layers is minimized.

8. The method as claimed in claim 7, wherein the gas diffusion layers are provided as a rolled product and are singularized to form gas diffusion layers, and to singularize the gas diffusion layers, gas diffusion layers are removed in succession from a roll in the transverse machine direction, and gas diffusion layers removed in succession are used such that each second removed gas diffusion layer is rotated by 180° relative to the transverse machine direction, and wherein the nonrotated gas diffusion layers and the rotated gas diffusion layers are alternately used as the anode gas diffusion layer and as the cathode gas diffusion layer for a single cell.

9. The method as claimed in claim 7, wherein the gas diffusion layers are provided as a rolled product and are singularized to form gas diffusion layers, and to singularize the gas diffusion layers, gas diffusion layers are removed in succession from a roll in the transverse machine direction and gas diffusion layers removed in succession are each stacked one on top of another, and each second one of the gas diffusion layers to be stacked or which are stacked on one another is rotated by 180° relative to the transverse machine direction, and gas diffusion layers stacked on one another are used as anode gas diffusion layers or cathode gas diffusion layers of single cells of the cell stack, which are arranged one on top of another.

10. The method as claimed in claim 7, wherein the gas diffusion layers are provided as a rolled product and are singularized to form gas diffusion layers, and to singularize the gas diffusion layers, gas diffusion layers are removed in succession from a roll in the transverse machine direction and gas diffusion layers removed in succession are each stacked one on top of another, and gas diffusion layers ascertained via a random generator are rotated by 180° relative to the transverse machine direction, and rotation or nonrotation have the same probability.

* * * * *